US012381306B2

(12) United States Patent
Kim et al.

(10) Patent No.: US 12,381,306 B2
(45) Date of Patent: Aug. 5, 2025

(54) ANTENNA DEVICE

(71) Applicant: KMW INC., Hwaseong-si (KR)

(72) Inventors: Duk Yong Kim, Yongin-si (KR); Kyo Sung Ji, Hwaseong-si (KR); Chi Back Ryu, Hwaseong-si (KR); Oh Seog Choi, Hwaseong-si (KR); Seong Man Kang, Daejeon (KR); Yong Won Seo, Daejeon (KR)

(73) Assignee: KMW INC., Hwaseong-si (KR)

( * ) Notice: Subject to any disclaimer, the term of this patent is extended or adjusted under 35 U.S.C. 154(b) by 138 days.

(21) Appl. No.: 18/099,918

(22) Filed: Jan. 21, 2023

(65) Prior Publication Data

US 2023/0163441 A1 May 25, 2023

Related U.S. Application Data

(63) Continuation of application No. PCT/KR2021/009687, filed on Jul. 27, 2021.

(30) Foreign Application Priority Data

Jul. 27, 2020 (KR) ........................ 10-2020-0093385
Jul. 26, 2021 (KR) ........................ 10-2021-0098001

(51) Int. Cl.
*H01Q 1/02* (2006.01)
*H01Q 21/06* (2006.01)

(52) U.S. Cl.
CPC ............. *H01Q 1/02* (2013.01); *H01Q 21/065* (2013.01)

(58) Field of Classification Search
CPC ........ H01Q 1/02; H01Q 21/065; H01Q 1/246; H01Q 21/061
See application file for complete search history.

(56) References Cited

U.S. PATENT DOCUMENTS

2007/0148996 A1 6/2007 Hildebrand et al.
2018/0019769 A1 1/2018 Hu et al.
(Continued)

FOREIGN PATENT DOCUMENTS

JP 2003-110333 A 4/2003
JP 2009-535942 A 10/2009
(Continued)

OTHER PUBLICATIONS

English translation of WO 2017/006959 A1 (Year: 2017).*
(Continued)

*Primary Examiner* — Daniel D Chang
(74) *Attorney, Agent, or Firm* — Insight Law Group, PLLC; Seung Lee

(57) ABSTRACT

The present invention relates to an antenna device and, particularly, comprises: a radiation cover; a plurality of radiation elements which are arranged on the front surface of the radiation cover so as to be exposed to outside air and which implement beamforming; and an antenna housing body on which the radiation cover is provided, wherein the heat, which is generated by a heating element arranged behind the radiation elements and the radiation cover, is released to the front of the antenna housing body through the front surface of the radiation cover and the radiation elements which are exposed to outside air, and thus the radiation performance of a product is remarkably improved, and the manufacturing cost of the product is reduced.

20 Claims, 19 Drawing Sheets

(56) References Cited

U.S. PATENT DOCUMENTS

| | | | |
|---|---|---|---|
| 2018/0198197 A1 | 7/2018 | Toyao et al. | |
| 2018/0219277 A1 | 8/2018 | Hirata et al. | |
| 2018/0316086 A1* | 11/2018 | Lehman | H04W 76/40 |
| 2018/0342784 A1 | 11/2018 | Samardzija et al. | |
| 2018/0358710 A1 | 12/2018 | Toyao et al. | |
| 2020/0021005 A1 | 1/2020 | Kosaka et al. | |
| 2021/0057796 A1* | 2/2021 | Xu | H01Q 1/246 |

FOREIGN PATENT DOCUMENTS

| | | | | |
|---|---|---|---|---|
| JP | 2013-187740 A | 9/2013 | | |
| JP | 2018-207403 A | 12/2018 | | |
| JP | 2019-536362 A | 12/2019 | | |
| KR | 10-2003-0075524 A | 9/2003 | | |
| KR | 10-0442135 B1 | 7/2004 | | |
| KR | 10-2013-0027330 A | 3/2013 | | |
| KR | 20130027330 A | * | 7/2013 | H04B 1/38 |
| KR | 10-2015-0095673 A | 8/2015 | | |
| KR | 10-2017-0124350 A | 11/2017 | | |
| WO | WO-2013170647 A1 | * | 11/2013 | H01Q 1/246 |
| WO | 2017-006959 A | 1/2017 | | |
| WO | WO-2017006959 A1 | * | 1/2017 | H01Q 1/02 |
| WO | 2019/199078 A1 | 10/2019 | | |
| WO | 2018/168699 A1 | 1/2020 | | |

OTHER PUBLICATIONS

English translation of KR-20130027330-A (Year: 2013).*

English translation of WO-2013170647-A1 (Year: 2013).*

International Search Report mailed Nov. 2, 2021 for International Application No. PCT/KR2021/009687 and its English translation.

Non-final Office Action mailed Aug. 11, 2022 from the Korean Intellectual Property Office for Korean Application No. 10-2021-0098001.

Non-final Office Action mailed on Jan. 30, 2024 from the Japanese Patent Office for Japanese Application No. 2023-504220.

Extended European Search Report dated Sep. 24, 2024 for Application No. 21849169.4.

Non-final Office Action mailed on Jun. 18, 2024 from the Japanese Patent Office for Japanese Application No. 2023-504220.

* cited by examiner

ANTENNA DEVICE

CROSS-REFERENCE TO RELATED APPLICATIONS

This application is a continuation application of International Application No. PCT/KR2021/009687, filed Jul. 27, 2021, which claims the benefit of Korean Patent Application Nos. 10-2020-0093385, filed Jul. 27, 2020; and 10-2021-0098001, filed Jul. 26, 2021, in the Korean Intellectual Property Office, the disclosures of which are incorporated herein in their entirety by reference.

TECHNICAL FIELD

The present disclosure relates to an antenna device, and more specifically, to an antenna device, which removes a board on which a radome and a radiation element are mounted or the like so that the radiation element is directly exposed to outside air, thereby manufacturing a slimmer product, reducing a manufacturing cost, and at the same time, enhancing heat-dissipation performance.

BACKGROUND ART

Base station antennas including repeaters used in mobile communication systems have various shapes and structures and generally have a structure in which a plurality of radiation elements are appropriately disposed on at least one reflector upright in a longitudinal direction.

Recently, studies are being actively conducted to achieve a compact, lightweight, and low-cost structure while satisfying high-performance requirements for a multiple-input and multiple-output (MIMO)-based antenna. In particular, antenna devices to which a patch type radiation element for implementing linear polarization or circular polarization is applied mainly use a method of plating a radiation element made of a dielectric board of a plastic or ceramic material and coupling the plated radiation element to a printed circuit board (PCB) or the like through soldering.

FIG. 1 is an exploded perspective view showing one example of an antenna device according to the related art.

As shown in FIG. 1, in an antenna device 1 according to the related art, a plurality of radiation elements 35 are arranged to be exposed toward a front surface of an antenna housing body 10 that is a beam output direction so that beams are output in a desired direction and beamforming is easy, and a radome 50 is mounted on a front end of the antenna housing body 10 with the plurality of radiation elements 35 therebetween in order to protect the antenna device from external environment.

More specifically, the antenna device 1 includes the antenna housing body 10 having a front surface with an open thin rectangular parallelepiped shape and a plurality of heat-dissipation fins 11 integrally formed on a rear surface thereof, a main board 20 disposed to be laminated on a rear surface of an inner side of the antenna housing body 10, and an antenna board 30 disposed to be laminated on a front surface of the inner side of the antenna housing body 10.

A plurality of feeding-related elements for calibration feeding control are mounted on the main board 20, and the heat of the elements generated in a feeding process is heat-dissipated rearward through the plurality of heat-dissipation fins 11 behind the antenna housing body 10.

In addition, a power supply unit (PSU) board 40 on which PSU elements are mounted is laminated under the main board 20 or the antenna housing body 10 or disposed at the same height as the main board 20 or the antenna housing body 10, and the heat generated from the PSU elements is also dissipated rearward through the plurality of heat-dissipation fins 11 provided integrally behind the antenna housing body 10 or the PSU heat-dissipation fins 16 of the PSU housing 15 formed separately from the antenna housing body 10 and attached to a rear surface of the antenna housing body 10.

A plurality of RF filters 25 provided in a cavity filter type are disposed on a front surface of the main board 20, and a rear surface of the antenna board 30 is disposed to be laminated on front surfaces of the plurality of RF filters 25.

A patch type radiation elements or dipole type radiation elements 35 may be mounted on the front surface of the antenna board 30, and the radome 50 for protecting each internal components from the outside and smoothly radiating beams from the radiation elements 35 may be installed on the front surface of the antenna housing body 10.

However, in one example of the antenna device 1 according to the related art, a front portion of the antenna housing body 10 is shielded by the radome 50 and thus a heat-dissipation area is inevitably limited as much as an area of the radome 50, and as the radiation elements 35 are also designed to transmit and receive only RF signals and thus the heat generated by the radiation elements 35 is not discharged forward, there is a problem in that the heat generated from the inside of the antenna housing body 10 is inevitably dissipated to the rear side of the antenna housing body 10 as a whole, thereby significantly reducing heat-dissipation efficiency, and a demand for a new heat-dissipation structure design for solving the problem is increasing.

In addition, according to one example of the antenna device 1 according to the related art, there is a problem in that it is very difficult to implement a slim-sized base station required for an in-building or 5G shadow region due to a volume of the radome 50 and a volume of the arrangement structure in which the radiation element 35 is spaced apart from the front surface of the antenna board 30.

DISCLOSURE

Technical Problem

The present disclosure has been made in efforts to solve the above technical problem and is directed to providing an antenna device, which may delete unnecessary components, such as a radome and a printed circuit board (PCB) on which a radiation element is mounted, thereby reducing a manufacturing cost of a product.

In addition, the present disclosure is directed to providing an antenna device capable of dissipating heat in a balanced manner in all directions of an antenna housing body.

In addition, the present disclosure is directed to providing an antenna device in which radiation elements may perform a heat transfer function as well as transmission and reception functions of a radio frequency (RF) signal by the radiation elements are closely assembled to a heat-dissipation cover made of a metal material.

In addition, the present disclosure is directed to providing an antenna device, which may reduce a manufacturing time and a labor cost by constructing a fully automated production line in the entire manufacturing process of a product.

The objects of the present disclosure are not limited to the above-described objects, and other objects that are not mentioned will be able to be clearly understood by those skilled in the art from the following descriptions.

Technical Solution

An antenna device according to one embodiment of the present disclosure includes a heat-dissipation cover, a plurality of radiation elements disposed on a front surface of the heat-dissipation cover, exposed to outside air, and configured to implement beamforming, and an antenna housing body on which the heat-dissipation cover is installed, wherein heat generated from the radiation elements and heating elements disposed behind the heat-dissipation cover is discharged forward from the antenna housing body through at least any one of the radiation element exposed to the outside air and the front surface of the heat-dissipation cover.

In addition, an antenna device according to another embodiment of the present disclosure includes a heat-dissipation cover, a plurality of radiation elements disposed on a front surface of the heat-dissipation cover, exposed to outside air, and configured to implement beamforming, an antenna housing body on which the heat-dissipation cover is installed and having a plurality of heat-dissipation fins integrally formed on a rear surface thereof, and a main board disposed to be laminated in an internal space between the antenna housing body and the heat-dissipation cover, wherein heat generated between the main board and the heat-dissipation cover is branched and discharged to a front side on which the heat-dissipation cover is disposed and a rear side on which the plurality of heat-dissipation fins are disposed.

In addition, an antenna device according to still another embodiment of the present disclosure includes a heat-dissipation cover, a plurality of radiation elements disposed on a front surface of the heat-dissipation cover, exposed to outside air, and configured to implement beamforming, and an antenna housing body on which the heat-dissipation cover is installed and having a plurality of heat-dissipation fins integrally formed on a rear surface thereof, wherein at least some of heat generated from the radiation elements and heating elements disposed behind the heat-dissipation cover is discharged forward from the antenna housing body through at least any one of the radiation element exposed to the outside air and the front surface of the heat-dissipation cover, and at least some of the heating elements disposed inside the antenna housing body are discharged rearward from the antenna housing body via the plurality of heat-dissipation fins formed on the rear surface of the antenna housing body.

Here, the plurality of radiation elements may be adopted as any one of a dipole type dipole antenna and a patch type patch antenna.

In addition, the plurality of radiation elements may include a patch plate made of a conductive material and a pair of feed terminals made of the conductive material connected to the patch plate, and the patch plate and the pair of feed terminals may be insert-injection-molded by a dielectric molding material having a predetermined thermal conductivity and a predetermined permittivity.

In addition, the dielectric molding material may be adopted as a predetermined thermal conductive material so that the heat generated between the antenna housing body and the heat-dissipation cover may be transmitted forward from the antenna housing body in a thermal conduction method.

In addition, the predetermined thermal conductive material may include an Ultem material.

In addition, the plurality of radiation elements may be bonded on the front surface of the heat-dissipation cover via a predetermined adhesive material.

In addition, a plurality of positioning protrusions may be formed to protrude forward from the front surface of the heat-dissipation cover, and the plurality of radiation elements may be press-fitted into and coupled to the plurality of positioning protrusions, respectively.

In addition, the plurality of radiation elements may be bonded to the front surface of the heat-dissipation cover via a predetermined adhesive material and press-fitted into and coupled to a plurality of positioning protrusions formed to protrude forward from the front surface of the heat-dissipation cover.

In addition, a feed terminal through hole passing through the heat-dissipation cover in a front-rear direction may be formed, and the plurality of radiation elements may be connected to an antenna sub-board closely disposed on the rear surface of the heat-dissipation cover after each of the pair of feed terminals passes through the feed terminal through hole.

In addition, a rear surface of the dielectric molding material may be closely fixed to the front surface of the heat-dissipation cover to minimize thermal conduction resistance.

In addition, a fine heat-dissipation uneven portion configured to increase a heat-dissipation surface area of the remaining portion except for a portion of the front surface of the heat-dissipation cover in contact with the plurality of radiation elements may be integrally formed on the heat-dissipation cover.

In addition, the fine heat-dissipation uneven portion may be provided in the form of a plurality of ribs protruding a predetermined length from the front surface of the heat-dissipation cover and formed lengthily in a vertical direction.

In addition, a plurality of flat installation portions to which each of the plurality of heat-dissipation elements is surface-fixed may be formed on the front surface of the heat-dissipation cover, and the fine heat-dissipation uneven portion may include a first fine uneven portion formed between the plurality of flat installation portions and a second fine uneven portion formed outside the plurality of flat installation portions.

In addition, a power supply unit (PSU) having a plurality of PSU elements mounted on a front surface thereof may be correspondingly disposed on the rear surface of the heat-dissipation cover on which the second fine uneven portion is formed.

In addition, front surfaces of a plurality of radio frequency (RF) filters and front surfaces of a plurality of PSU elements may be closely disposed on the rear surface of the heat-dissipation cover.

In addition, the plurality of RF filters may be adopted as any one of a cavity filter and a ceramic waveguide filter.

In addition, a heat-dissipation cover heat accommodating portion may be further formed to be recessed forward from the rear surface of the heat-dissipation cover so that the front surfaces of the plurality of PSU elements are closely accommodated, and the front surfaces of the plurality of PSU elements may be accommodated to be in surface thermal contact with the heat-dissipation cover heat accommodating portion.

In addition, the heat-dissipation cover may be mold-manufactured in a die-casting method with a metal molding material of any one of an aluminum (Al) material or a magnesium (Mg) material.

In addition, the heat-dissipation cover may be mold-manufactured with the same material as the antenna housing body.

Advantageous Effects

According to the antenna device according to one embodiment of the present disclosure, it is possible to achieve various effects as follows.

First, it is possible to delete components, such as the radome and the antenna board (PCB) serving as a reflector, which are essential components of the conventional antenna device, thereby significantly reducing the manufacturing cost of the product.

Second, it is possible to dissipate the system heat inside the antenna housing body forward as much as the area of the heat-dissipation cover increased by deleting the radome, thereby significantly enhancing heat-dissipation performance.

Third, it is possible to construct the fully automated production line in the entire manufacturing process of the product, thereby reducing the manufacturing time, the labor cost, and the like.

MODE FOR INVENTION

Figure 1:
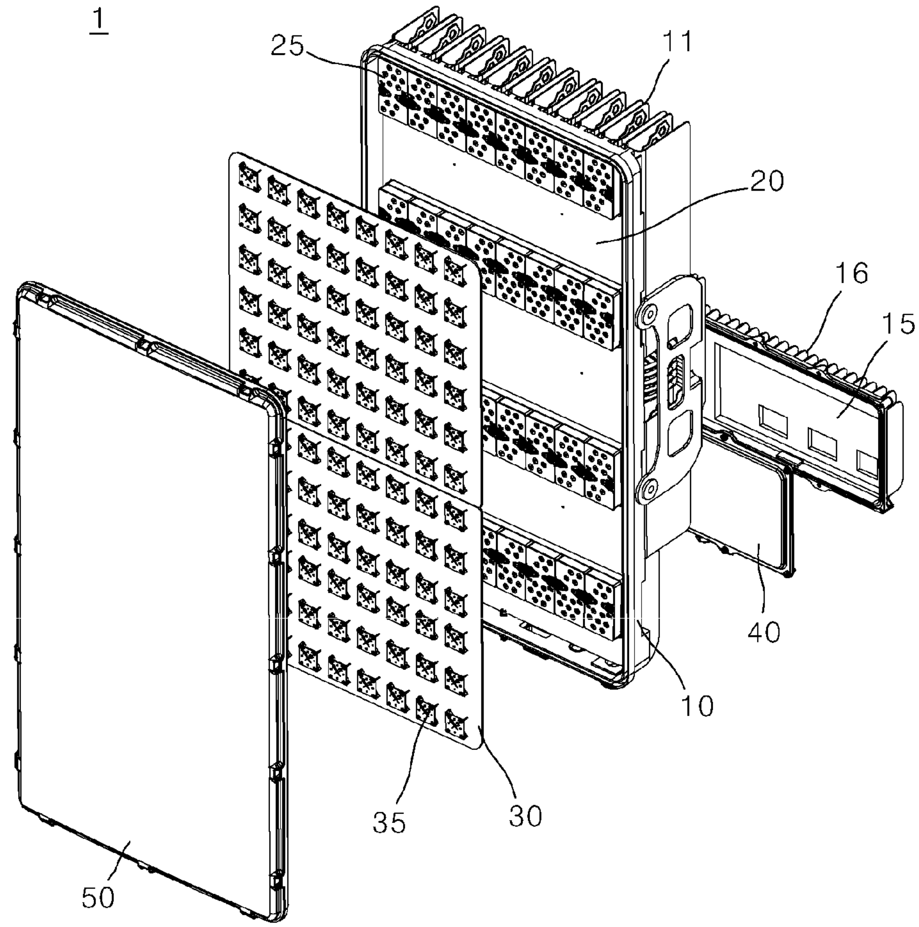
FIG. 1 is an exploded perspective view showing one example of an antenna device according to the related art.

Hereinafter, an antenna device according to one embodiment of the present disclosure will be described in detail with reference to the accompanying drawings.

In adding reference numerals to components in each drawing, it should be noted that the same components have the same reference numerals as much as possible even when they are shown in different drawings. In addition, in describing embodiments of the present disclosure, the detailed description of related known configurations or functions will be omitted when it is determined that the detailed description obscures the understanding of the embodiments of the present disclosure.

The terms, such as first, second, A, B, (a), and (b) may be used to describe components of the embodiments of the present disclosure. The terms are only for the purpose of distinguishing one component from another, and the nature, sequence, order, or the like of the corresponding components is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

Figure 2:
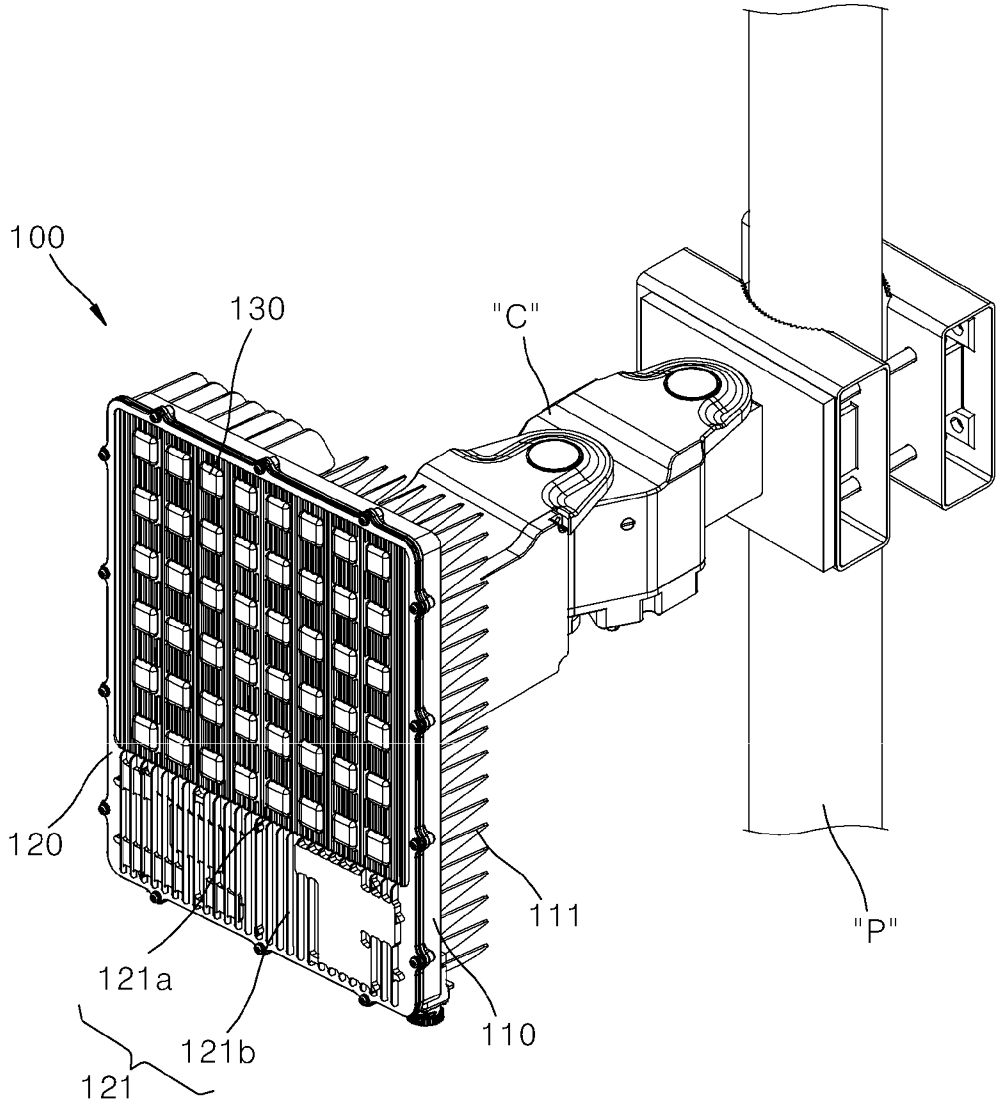
FIG. 2 is an external perspective view showing an installation example of an antenna device according to one embodiment of the present disclosure.
Figure 3A:
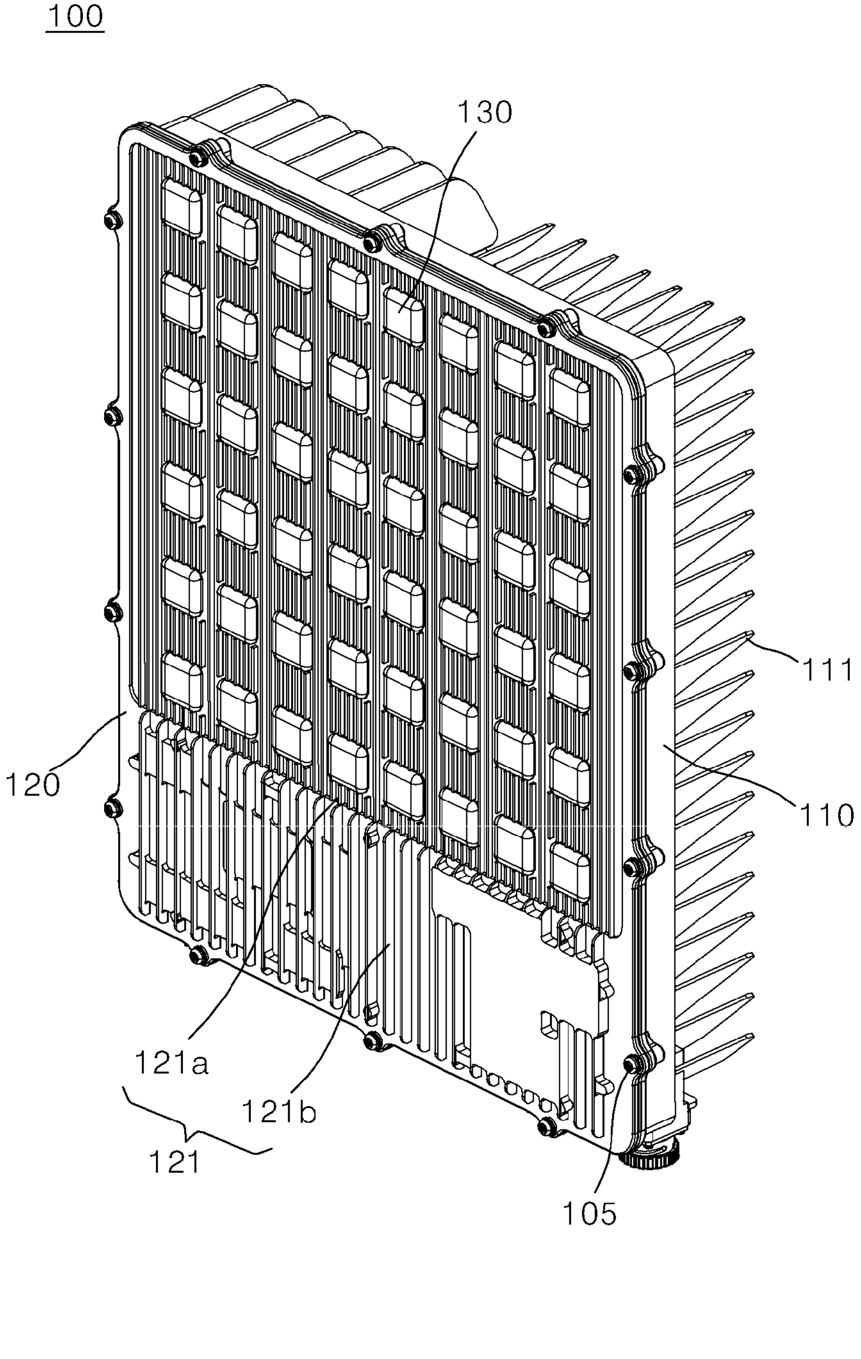
FIGS. 3A and 3B are perspective views showing front and rear portions of the antenna device according to one embodiment of the present disclosure.
Figure 3B:
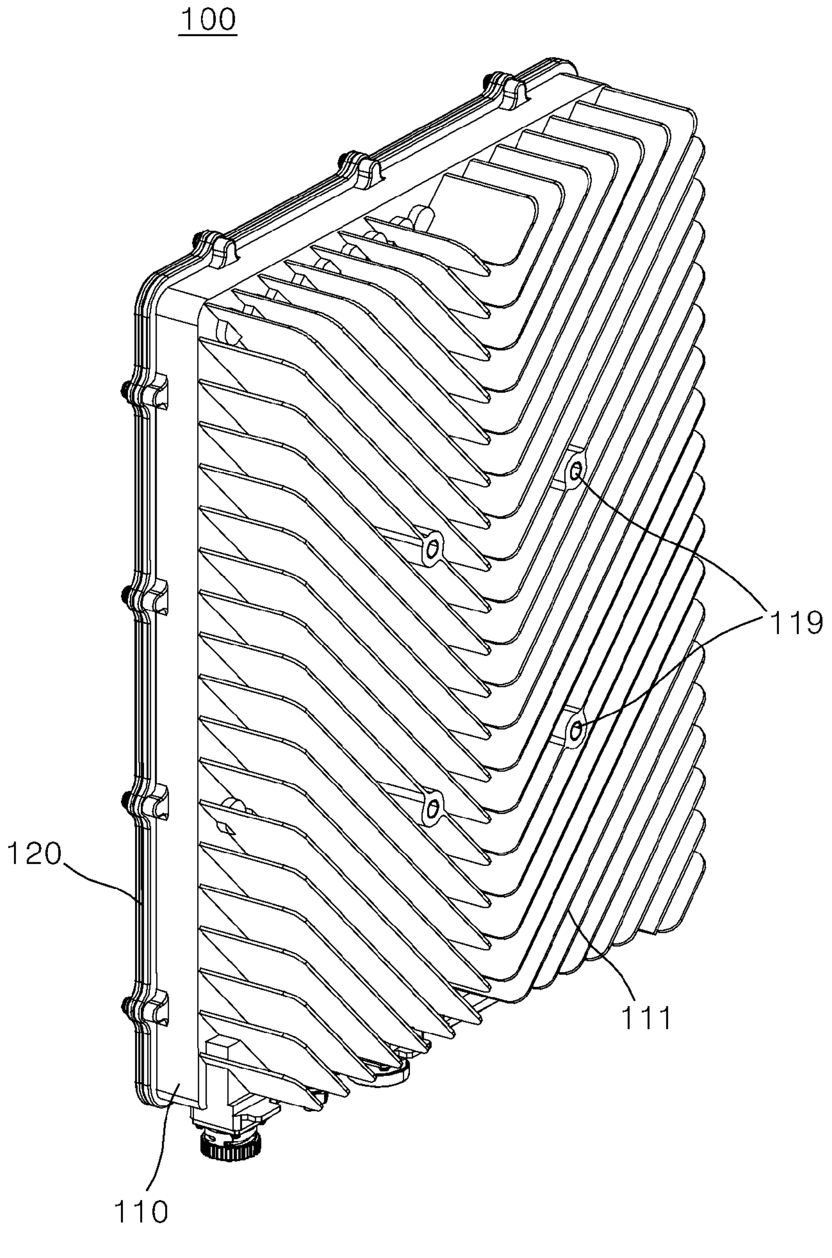
Figure 4A:
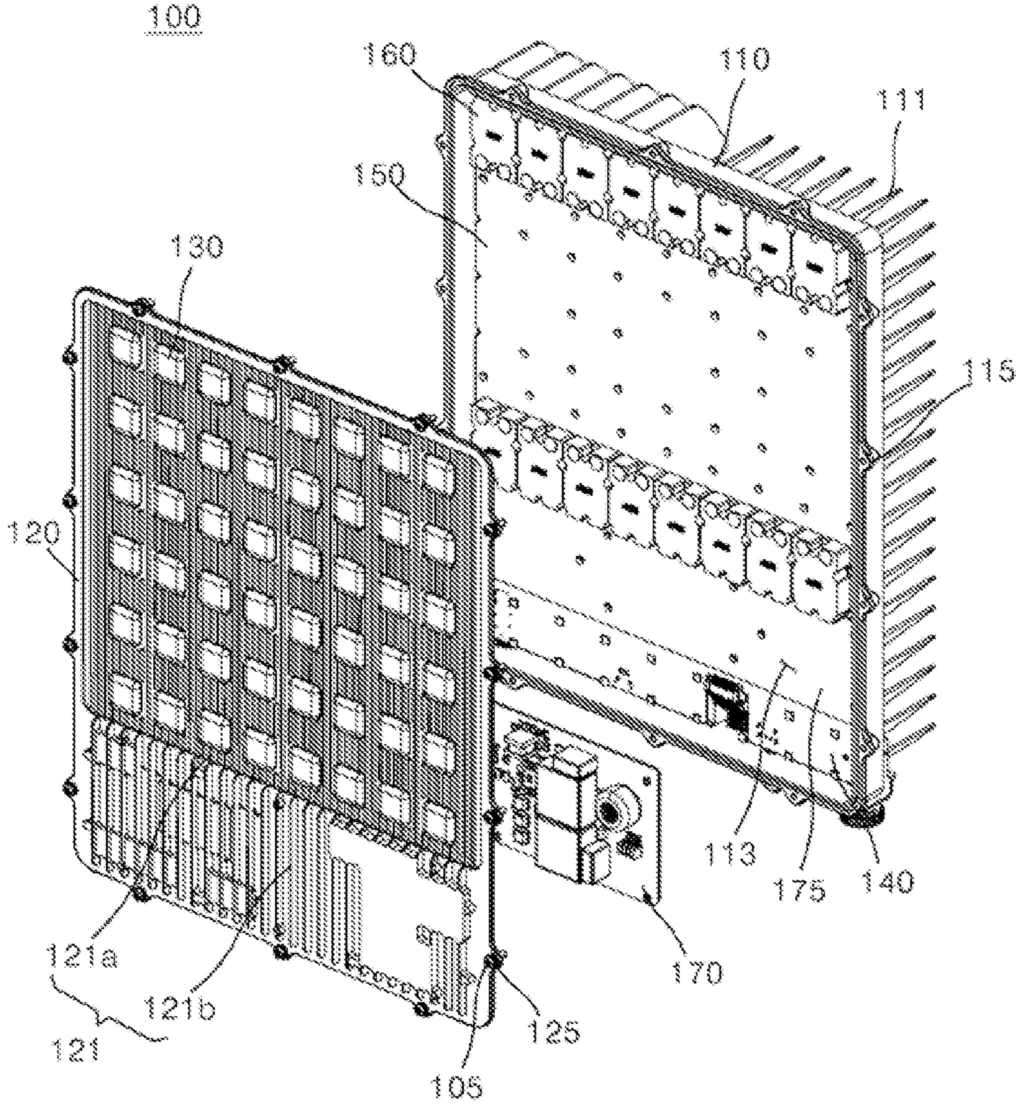
FIGS. 4A and 4B are exploded perspective views showing an internal space of an antenna housing body in a configuration of the antenna device according to one embodiment of the present disclosure.
Figure 4B:
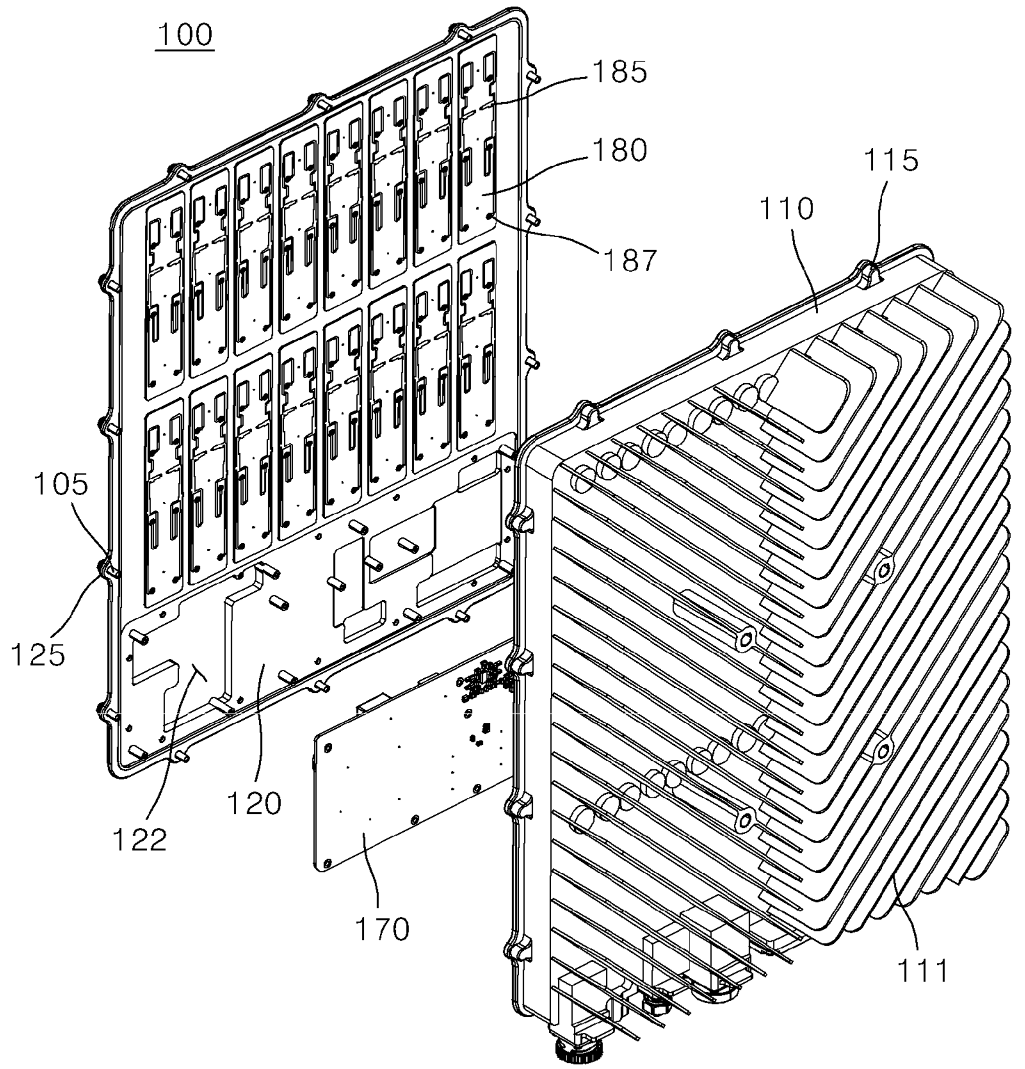
Figure 5A:
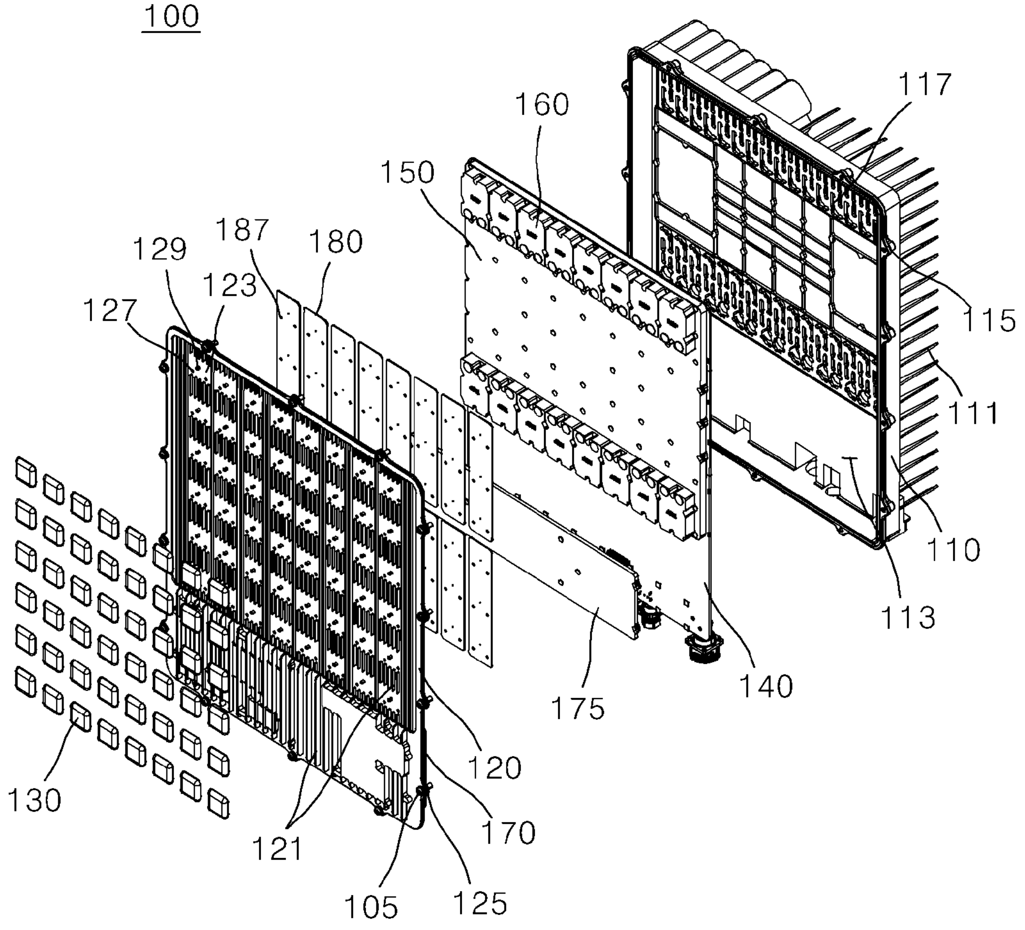
FIGS. 5A and 5B are exploded perspective views of the front and rear portions of the antenna device according to one embodiment of the present disclosure.
Figure 5B:
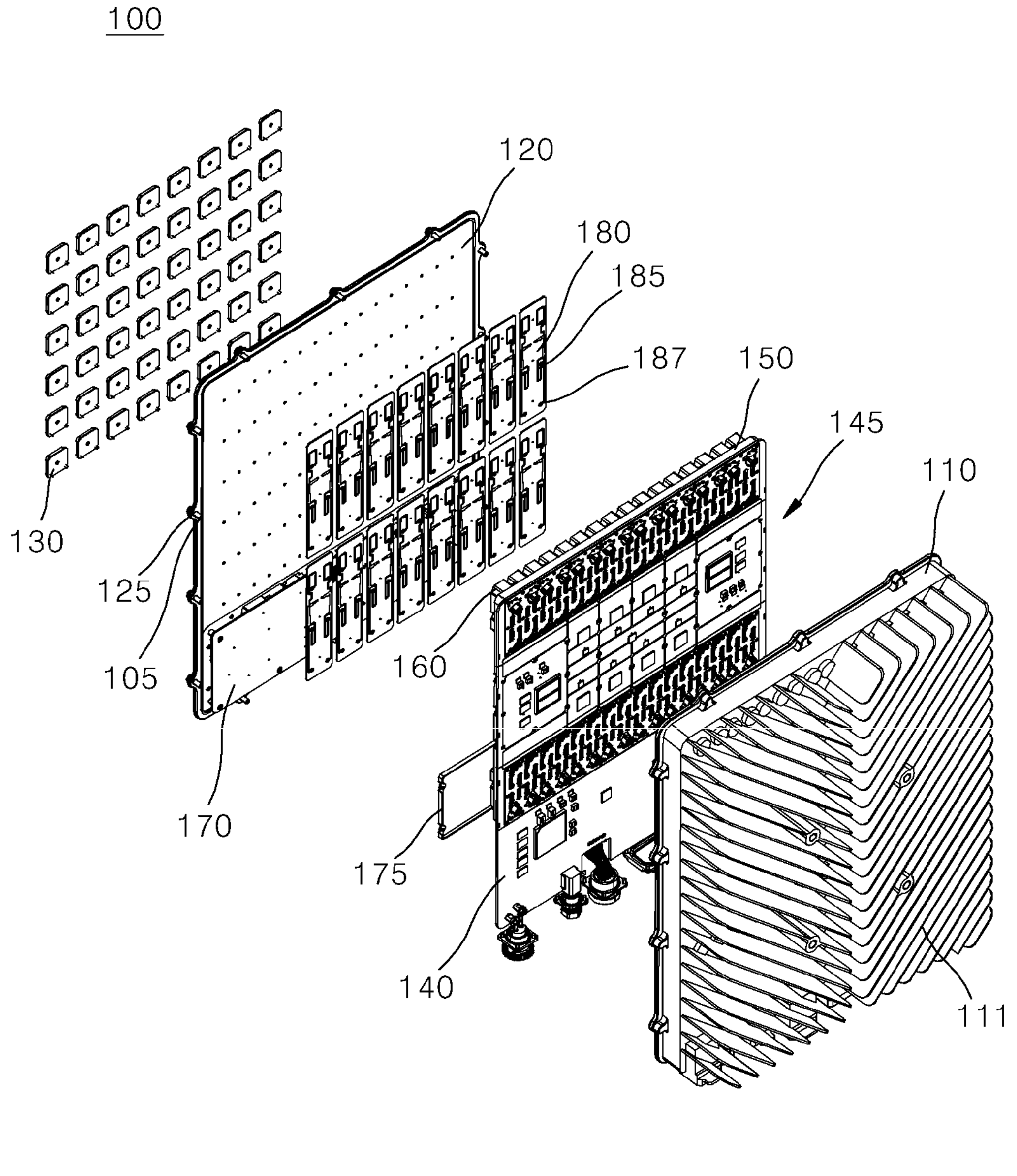

FIG. 2 is an external perspective view showing an installation example of an antenna device according to one embodiment of the present disclosure, FIGS. 3A and 3B are perspective views showing front and rear portions of the antenna device according to one embodiment of the present disclosure, FIGS. 4A and 4B are exploded perspective views showing an internal space of an antenna housing body in a configuration of the antenna device according to one embodiment of the present disclosure, and FIGS. 5A and 5B are exploded perspective views of the front and rear portions of the antenna device according to one embodiment of the present disclosure.

As shown in FIG. 2, an antenna device 100 according to one embodiment of the present disclosure may be coupled to a front end of a clamping portion C disposed to be spaced apart in a horizontal direction orthogonal to a holding pole P. The clamping portion C may be provided to be rotated in a left-right direction and tilted in a vertical direction with respect to the holding pole P to adjust a beam output direction of the antenna device 100 according to one embodiment of the present disclosure coupled to the front end of the clamping portion C.

However, the clamping portion C only adjusts transmission and reception directions of radio waves in a wide range and is not a substantial component for realizing beamforming. In order to realize the beamforming, as shown in FIGS. 2 to 4B, a plurality of radiation elements 130 are required as an array antenna. A plurality of radiation elements 130 may increase the concentration of the radio waves in a designated direction by generating a narrow directional beam.

Recently, as the plurality of radiation elements 130, a dipole type dipole antenna or a patch type patch antenna are used with the highest frequency and the plurality of radiation elements 130 are designed to be disposed to be spaced apart in order to minimize signal interference therebetween. Here, as the radiation element 130, any one of the above-described dipole type dipole antenna and patch type patch antenna may be adopted, but hereinafter, in one embodiment of the present disclosure, a description thereof will be given on the basis of the radiation element 130 adopting the patch type patch antenna.

In the related art, in general, in order to prevent the arrangement design of the plurality of radiation elements 130 from being changed by external environmental factors, a radome for protecting the plurality of radiation elements 130 from the outside has been an essential component. Therefore, since only portions of the plurality of radiation elements 130 and an antenna board (printed circuit board (PCB)) on which the plurality of radiation elements 130 are installed, which are covered by the radome, are not exposed to outside air, it is a very limited in that heat-dissipation to a front outside air side is not possible in dissipating the system heat generated by an operation of the antenna device 100 to the outside.

In the antenna device 100 according to one embodiment of the present disclosure, the radome is deleted so that all of the plurality of radiation elements 130 and a component (front surface of a heat-dissipation cover 120 to be described below) on which the plurality of radiation elements are installed are directly exposed to the outside air, and at the same time, the plurality of radiation elements 130 are also designed to not only serve to perform the transmission and reception functions of a signal but also serve as a heat transfer medium at the same time.

More specifically, as shown in FIGS. 3A to 4B, the antenna device 100 according to one embodiment of the present disclosure includes the heat-dissipation cover 120, the plurality of radiation elements 130 disposed on a front surface of the heat-dissipation cover 120, exposed to the outside air, and for realizing beamforming, and an antenna housing body 110 on which the heat-dissipation cover 120 is installed.

As shown in FIG. 4A, the antenna housing body 110 may be made of a metal material having excellent thermal conductivity, formed in a thin rectangular parallelepiped shape substantially in a front-rear direction, and formed to have an open front surface to form an internal space 113 in which a main board 140, a plurality of radio frequency (RF) filters 160, and a power supply unit (PSU) board 170 are installed, which will be described below.

On a rear surface of the antenna housing body 110, a plurality of heat-dissipation fins 111 are formed integrally with the antenna housing body 110 to have a predetermined pattern shape, and the heat generated from a rear portion of the internal space 113 of the antenna housing body 110 may be quickly dissipated rearward through the plurality of heat-dissipation fins 111.

The plurality of heat-dissipation fins 111 may be disposed to be inclined upward toward a left end and a right end with respect to a central portion of left and right widths and designed so that the heat dissipated to the rear of the antenna housing body 110 forms an updraft distributed in each of the left direction and right direction of the antenna housing body 110.

A bracket installation boss 119 on which a clamping bracket portion (not shown) for mediating the coupling to the front end of the clamping portion is installed may be formed integrally on some of the plurality of heat-dissipation fins 111.

Meanwhile, a plurality of screw fastening ends 115 in which a plurality of screw fastening holes for the screw-coupling with the heat-dissipation cover 120 are respectively formed may be formed to be spaced apart by predetermined intervals along an edge of a front edge portion of the antenna housing body 110.

The main board 140 may be fixedly laminated in parallel with the antenna housing body 110 in the internal space 113 of the antenna housing body 110. Feeding-related control components constituting a feeding network for controlling the calibration of a feeding signal using power supplied by the PSU board 170 may be mounted on a rear surface of the main board 140, and the RF filter 160, which is a plurality of band pass filters connected to the feeding network may be disposed to be mounted on the front surface of the main board 140.

Most of the feeding-related control components are heating elements (e.g., TA, DA, RA, LNA, and FPGA) and preferably mounted on the rear surface of the main board 140 to be in direct surface thermal contact with an inner surface of the antenna housing body 110 and to dissipate heat to the rear of the antenna housing body 110.

In addition, as shown in FIGS. 5A and 5B, predetermined patterns for electrically communicating feeding-related control components may be printed on the rear surface of the main board 140, and the feeding-related control components and the predetermined patterns protruding rearward may each have different heights. Here, as described above, heat accommodating patterns 117 having a shape accommodating the protruded portions of each of the feeding-related control components and each of the predetermined patterns may be processed and formed on the inner surface of the antenna housing body 110 in an engraved shape so that the feeding-related control components and the predetermined patterns, each of which protrudes at different heights, are in a direct surface thermal contact with each other over an area as wide as possible.

The plurality of RF filters 160 may be mounted and disposed on the front surface of the antenna housing body 110 side by side in the left-right direction via a clamshell board 150. In the antenna device 100 according to one embodiment of the present disclosure, the plurality of RF filters 160 are adopted as being disposed in one row in the left-right direction on an upper end of the clamshell board 150 and disposed in one row in the left-right direction on a central portion of the clamshell board 150, but the present disclosure is not limited thereto, and it goes without saying that the arrangement position and the number of RF filters 160 may be variously modified in design.

The plurality of RF filters 160 may be adopted and disposed as cavity filters each having a plurality of cavities therein and for filtering a frequency band of an output signal to an input signal by adjusting a frequency using a resonator of each cavity. However, the plurality of RF filters 160 are not necessarily limited to the cavity filters, and ceramic waveguide filters are not excluded.

The RF filter 160 having a small thickness in the front-rear direction is advantageous in a design for realizing the slimness of the entire product. In terms of this design, the RF filter 160 may prefer to use the ceramic waveguide filter having an advantageous miniaturization design rather than the cavity filter having a limited design for reducing the thickness in the front-rear direction.

The RF filter 160 may be formed on the clamshell board 150 and may pass through the clamshell board 150 in a shape into which an input/output terminal unit 165 provided for connection with an input port (not shown) and an output port (not shown) is inserted into each of a plurality of feeding connection holes 155 (see FIG. 12B to be described below) provided to be spaced apart from each other in a pair and may be mounted on the main board 140.

Meanwhile, in the antenna device 100 according to one embodiment of the present disclosure, as shown in FIGS. 4A and 4B, the front surface of the main board 140 laminated in the internal space 113 of the antenna housing body 110 may further include the PSU board 170 laminated via a shielding plate 175. A plurality of PSU elements, which are one of representative heating elements, may be mounted on a front surface of the PSU board 170, and the PSU elements may be in direct surface thermal contact with a rear surface of the heat-dissipation cover 120.

Here, as shown in FIG. 4A, the plurality of PSU elements may be formed so that each of front ends has a different height by using a front surface of the PSU board 170 as a mounted surface, and as shown in FIG. 4B, a heat-dissipation cover heat accommodating portion 122 may be patterned and formed on the rear surface of the heat-dissipation cover 120 so that the front ends of the plurality of PSU elements are accommodated and in direct surface thermal contact with the rear surface of the heat-dissipation cover 120 over an area as wide as possible.

Figure 6:
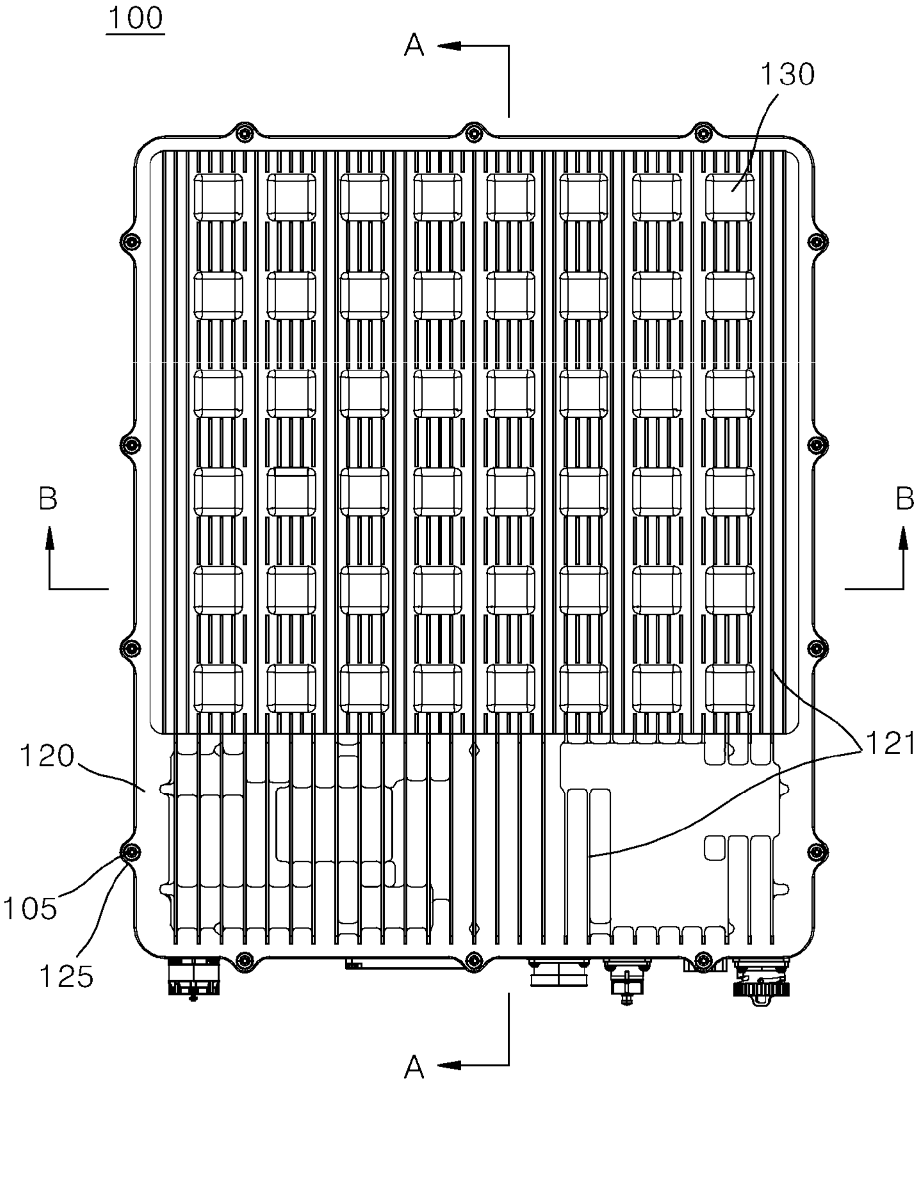
FIG. 6 is a front view of the antenna device according to one embodiment of the present disclosure.
Figure 7A:
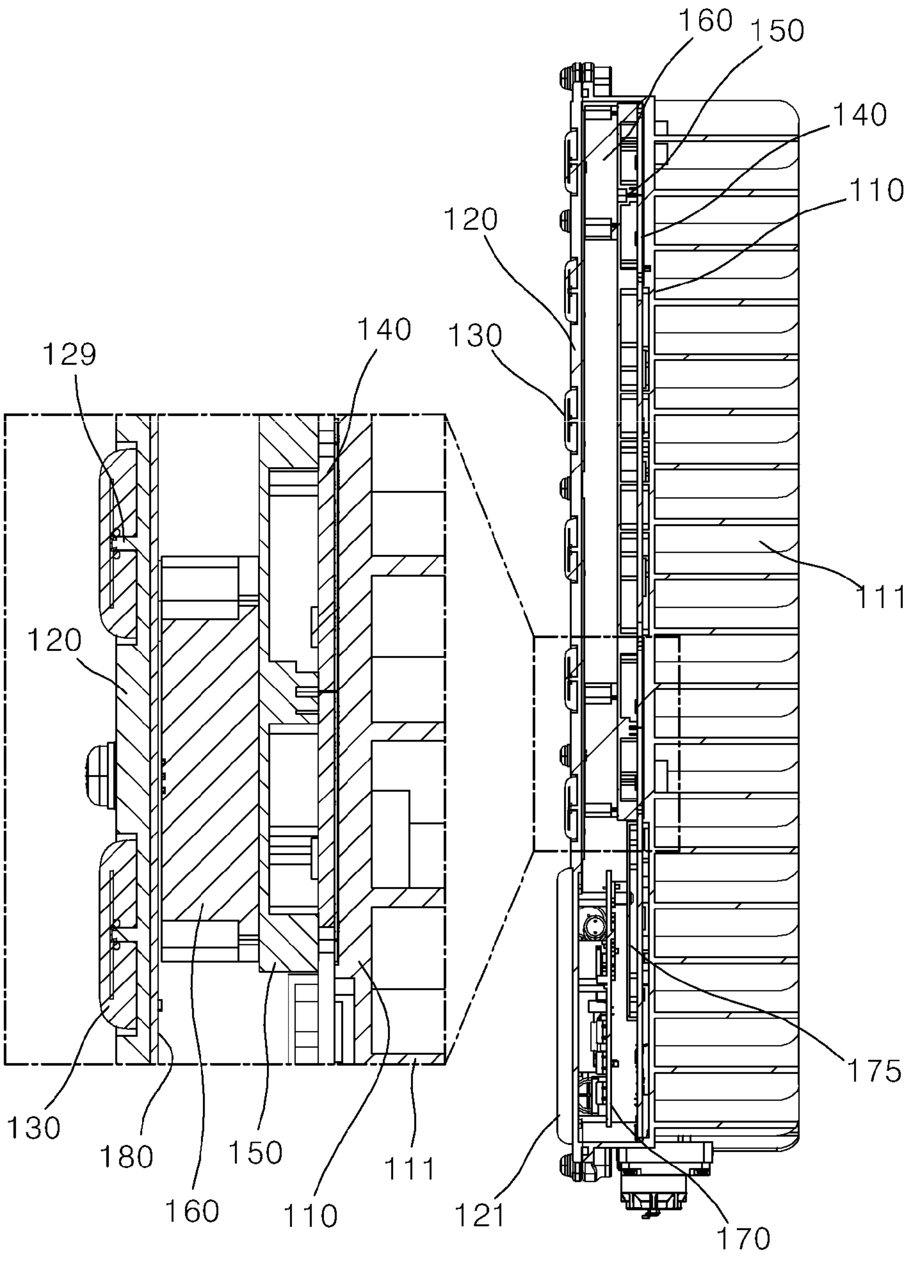
FIGS. 7A and 7B are a cross-sectional view and a cutout perspective view along the line A-A in FIG. 6.
Figure 7B:
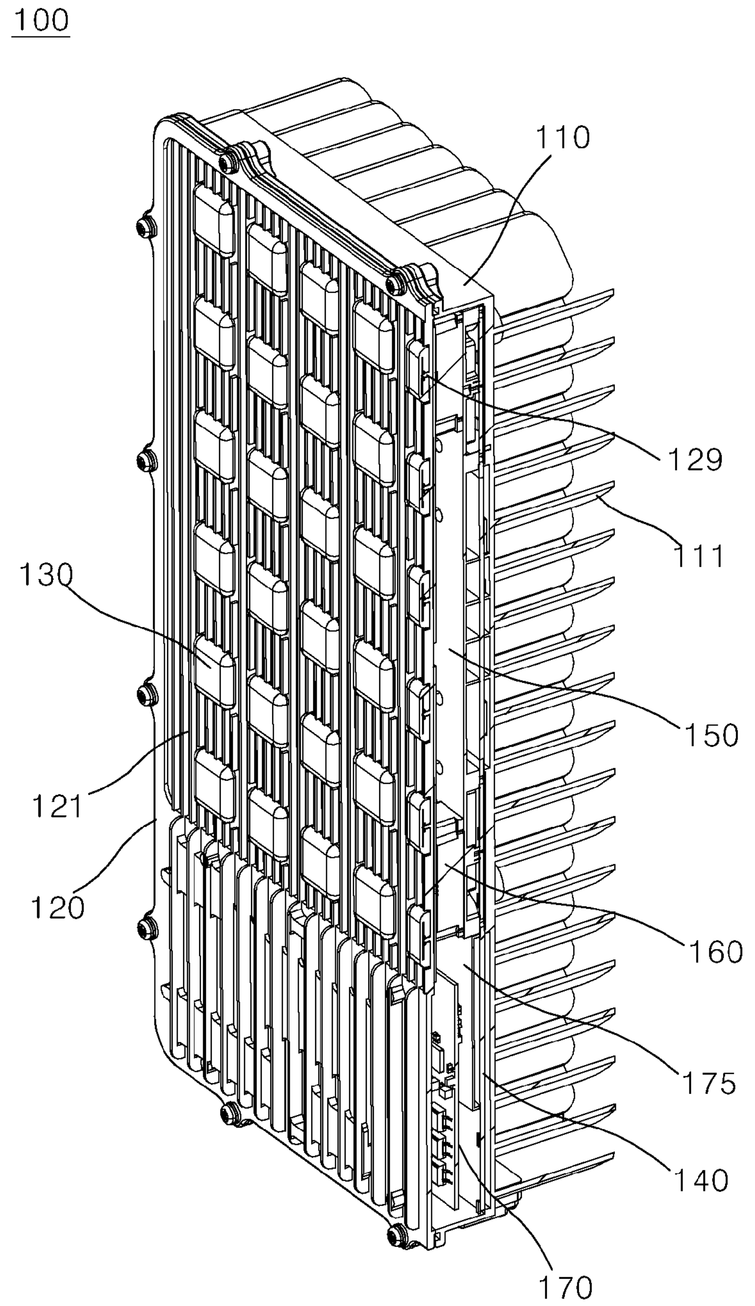
Figure 8A:
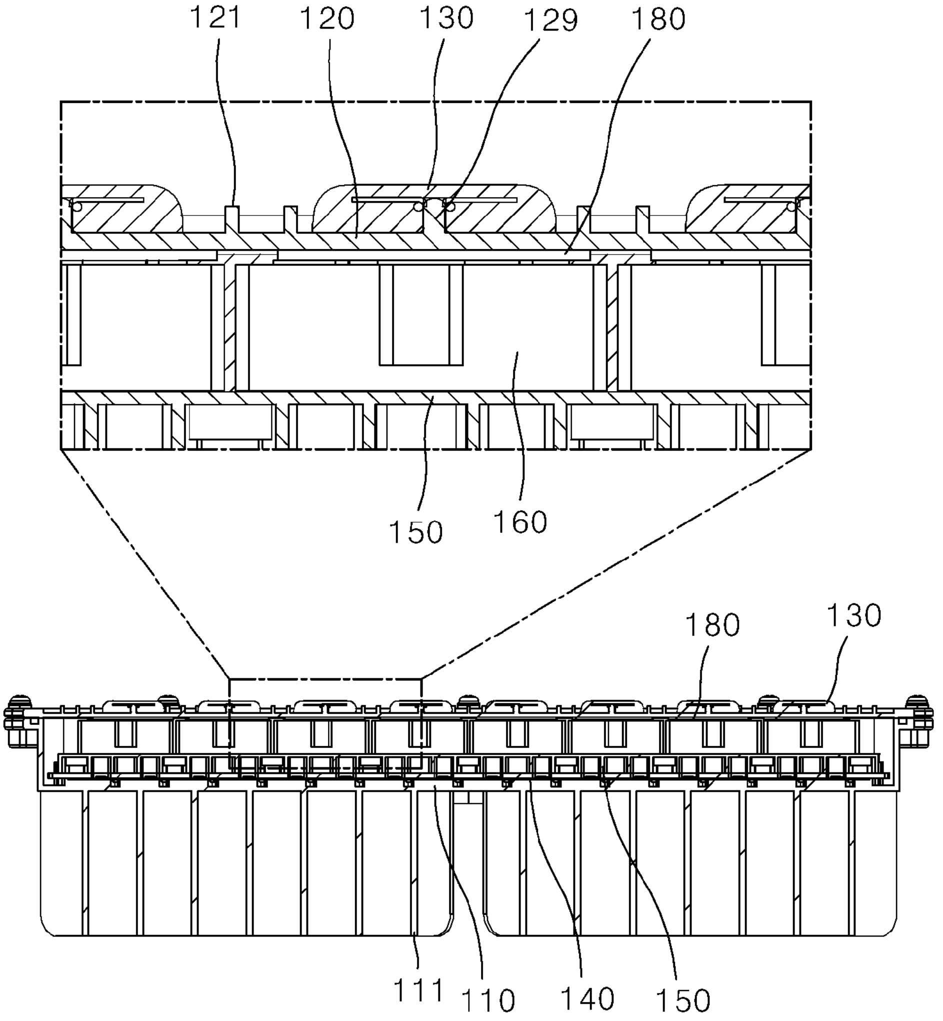
FIGS. 8A and 8B are a cross-sectional view and a cutout perspective view along line B-B in FIG. 6.
Figure 8B:
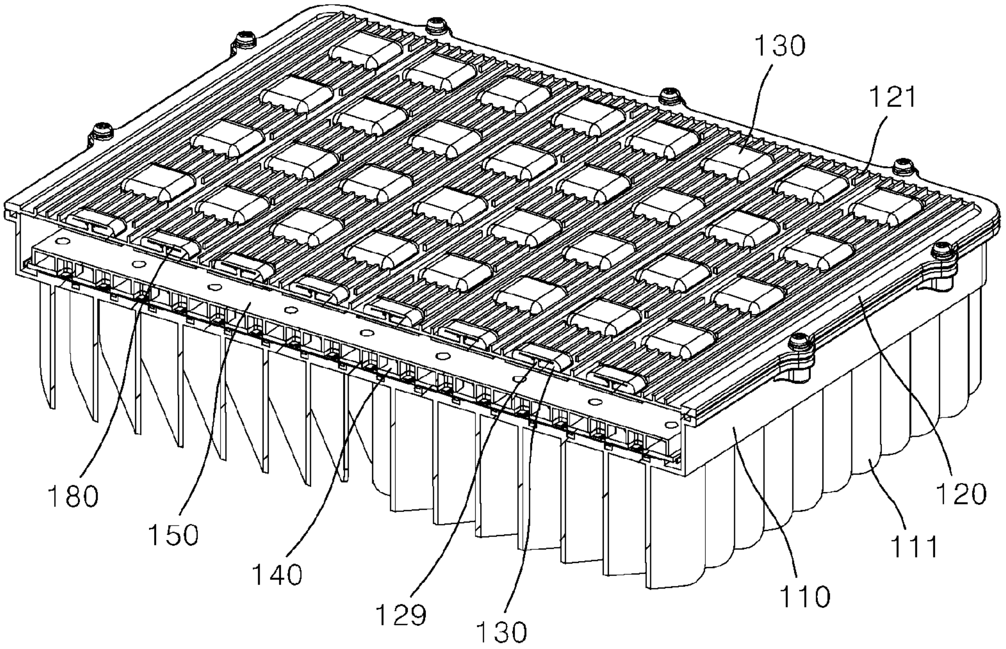

FIG. 6 is a front view of the antenna device according to one embodiment of the present disclosure, FIGS. 7A and 7B are a cross-sectional view and a cutout perspective view along the line A-A in FIG. 6, and FIGS. 8A and 8B are a cross-sectional view and a cutout perspective view along line B-B in FIG. 6.

As shown in FIGS. 6 to 8B, in the antenna device 100 according to one embodiment of the present disclosure, the heat-dissipation cover 120 may be coupled to the front end of the antenna housing body 110 to completely shield the internal space 113 of the antenna housing body 110 from the outside.

The heat-dissipation cover 120 may be made of a metal material having excellent thermal conductivity and preferably, may be made of an aluminum (Al) material or a magnesium (Mg) material. The heat-dissipation cover 120 forms a front appearance of the antenna device 100 according to one embodiment of the present disclosure and may be defined as a component that is directly exposed to the outside air to which the system heat (operation heat of various electronic components) generated from the internal space 113 of the antenna housing body 110 together with the antenna housing body 110 is finally discharged. In other words, in the related art, since the radome for protecting the plurality of radiation elements 130 from the external environmental factors is essentially provided, the component exposed to the outside air becomes the radome, but the antenna device 100 according to one embodiment of the present disclosure may be configured so that the heat-dissipation cover 120 is directly exposed to the outside air in front of the antenna device 100 like the antenna housing body 110 exposed to the outside air behind the antenna device 100 to simultaneously serve to mediate the dissipation of the system heat.

Since the heat-dissipation cover 120 serves to mediate heat transfer, the heat-dissipation cover 120 may be mold-manufactured in a die-casting method using a metal molding material made of aluminum (Al) or a magnesium (Mg) as a metal material having excellent thermal conductivity. Preferably, the heat-dissipation cover 120 may be mold-manufactured with the same material as the antenna housing body 110.

Here, a plurality of flat installation portions 123 in which each of the plurality of radiation elements 130 of the patch type is surface-fixed may be formed on the front surface of the heat-dissipation cover 120 in a flat shape. A positioning protrusion 129 may be formed to protrude a predetermined length forward from the heat-dissipation cover 120 at the center of each of the plurality of flat installation portions 123, and each of the plurality of radiation elements 130 may be press-fitted and coupled to each of the plurality of positioning protrusions 129. This will be described in more detail below.

Meanwhile, a plurality of fine heat-dissipation uneven portions 121 may be integrally formed on the remaining portion of the front surface of the heat-dissipation cover 120, which is not occupied by the plurality of flat installation portions 123, in a serration shape or a rib shape. Here, the plurality of fine heat-dissipation uneven portions 121 may be formed lengthily in the vertical direction.

In addition, when the plurality of fine heat-dissipation uneven portions 121 are provided in the rib shape, the plurality of fine heat-dissipation uneven portions 121 may be formed to protrude a predetermined length from the front surface of the heat-dissipation cover 120. In this case, the plurality of fine heat-dissipation uneven portions 121 may be formed to protrude at least by a length that is equal to an edge end of the heat-dissipation cover 120 or a length that is smaller than the edge end of the heat-dissipation cover 120.

In the antenna device 100 according to one embodiment of the present disclosure, as shown in FIG. 3A, the plurality of fine heat-dissipation uneven portions 121 may include a first fine uneven portion 121*a* formed on a portion (in the embodiment, an upper side except for a lower end of the heat-dissipation cover 120) of the heat-dissipation cover 120 on which the plurality of radiation elements 130 are disposed and a second fine uneven portion 121*b* formed on the lower end of the heat-dissipation cover 120 as a portion irrelevant to the plurality of radiation elements 130.

More specifically, the first fine uneven portion 121*a* may be formed between the plurality of flat installation portions 123 formed on the front surface of the heat-dissipation cover 120 so that each of the plurality of radiation elements 130 is surface-fixed, and the second fine uneven portion 121*b* may be formed outside the plurality of flat installation portions 123.

In addition, as will be described below, the PSU board 170 in which the plurality of PSU elements are mounted on the front surface thereof may be correspondingly disposed on the rear surface of the heat-dissipation cover 120 on which the second fine uneven portion 121*b* is formed.

The first fine uneven portion 121*a* serves to increase a heat exchange area with the outside air in dissipating the system heat to the outside through the heat-dissipation cover 120. Here, the front end of the first fine uneven portion 121*a* is preferably designed to protrude a length that less protrudes forward than the front surfaces of the plurality of radiation elements 130. The more the front end of the first fine uneven portion 121*a* protrudes with respect to the front surface of the heat-dissipation cover 120, the greater the concern on the signal interference of each of the plurality of radiation elements 130, thereby hindering the slim design of the entire product.

However, since the second fine uneven portion 121*b* is an uneven portion of a portion in charge of the heat generated from the PSU elements of the PSU board 170 and formed on the portion irrelevant to the signal interference of the plurality of radiation elements 130, the height of the front end of the second fine uneven portion 121*b* may be designed to have a length that more protrudes forward than the front surfaces of the plurality of radiation elements 130.

A plurality of screw through ends 125, which are formed to be spaced apart by a predetermined distance along an edge end of the edge portion of the heat-dissipation cover 120 and having a screw through hole to correspond to the screw fastening end 115 formed on the antenna housing body 110, may be formed on the edge portion of the heat-dissipation cover 120. The screw through hole (not shown) through which fastening screw 105 passes may be formed in each of the plurality of screw through ends 125.

The heat-dissipation cover 120 may be fixed to the front end of the antenna housing body 110 with a strong coupling force by the plurality of fastening screws 105 each passing through the screw through holes of the screw through end 125 on the front side and then fastened to the screw fastening hole (not shown) formed in the screw fastening end 115 of the antenna housing body 110.

Meanwhile, each of the plurality of radiation elements 130 may be disposed in the plurality of flat installation portions 123 formed on the front surface of the heat-dissipation cover 120. Feed terminal through holes 127 passing through the heat-dissipation cover 120 in the front-rear direction may be formed in the plurality of flat installation portions 123.

A plurality of feeding panels 180 on which feeding patterns 185 for the feeding to some of the adjacent radiation elements 130 among the plurality of radiation elements 130 are formed may be disposed on the rear surface of the heat-dissipation cover 120. A feed connection hole 187 into which feed terminals **132*a* and 132*b* of the radiation elements 130 to be described below are inserted into and connected to the feeding pattern 185 may be further formed in the feeding panel 180**.

After feeding signals fed through the plurality of feeding control-related components mounted on the main board 140 may be input to the RF filter 160 through an input terminal of the input/output terminal unit 165 of the RF filter 160 disposed on the front surface of the main board 140, and then frequency-filtered to a desired band, then input to the radiation elements 130 via one **132*a* of the pair of feed terminals 132*a* and 132*b* passing through the feed connection hole 187 through a circuit of the feeding pattern 185 of the feeding panel 180**, transmission data may be output in the form of electromagnetic waves.

Conversely, the reception data received to the radiation elements 130 in the form of electromagnetic waves may be input to the RF filter 160 via the feed connection hole 187 through the other **132*b* of the pair of feed terminals 132*a* and 132*b* and then transmitted back to the main board 140 side through an output terminal of the input/output terminal unit 165 of the RF filter 160**.

As described above, the plurality of radiation elements 130 conceptually include both of the patch type radiation element 130 and the dipole type radiation element 130, but in the antenna device 100 according to one embodiment of the present disclosure, a description thereof will be given on the basis of the plurality of radiation elements 130 being the patch type radiation element 130 for convenience of description.

As will be described below, each of the plurality of radiation elements 130 includes a patch plate 131 made of a conductive material and the pair of feed terminals **132*a* and 132*b* made of the conductive material connected to the patch plate 131, and the pair of feed terminals 132*a* and 132*b* may be installed to pass through the feed terminal through hole 127 each formed in the flat installation portion 123 of the heat-dissipation cover 120**.

Here, the plurality of radiation elements 130 may be installed on the front surface of the heat-dissipation cover 120 and installed so that the surfaces of the plurality of radiation elements 130 are directly exposed to the outside air, and thus, unlike the conventional radiation element serving to simply perform the transmission and reception functions of the signal, may serve to discharge the heat generated from the internal space 113 of the antenna housing body 110 or directly discharge the heat generated from the plurality of radiation elements 130 themselves to the outside air by serving as one heat transfer medium.

Figure 9:
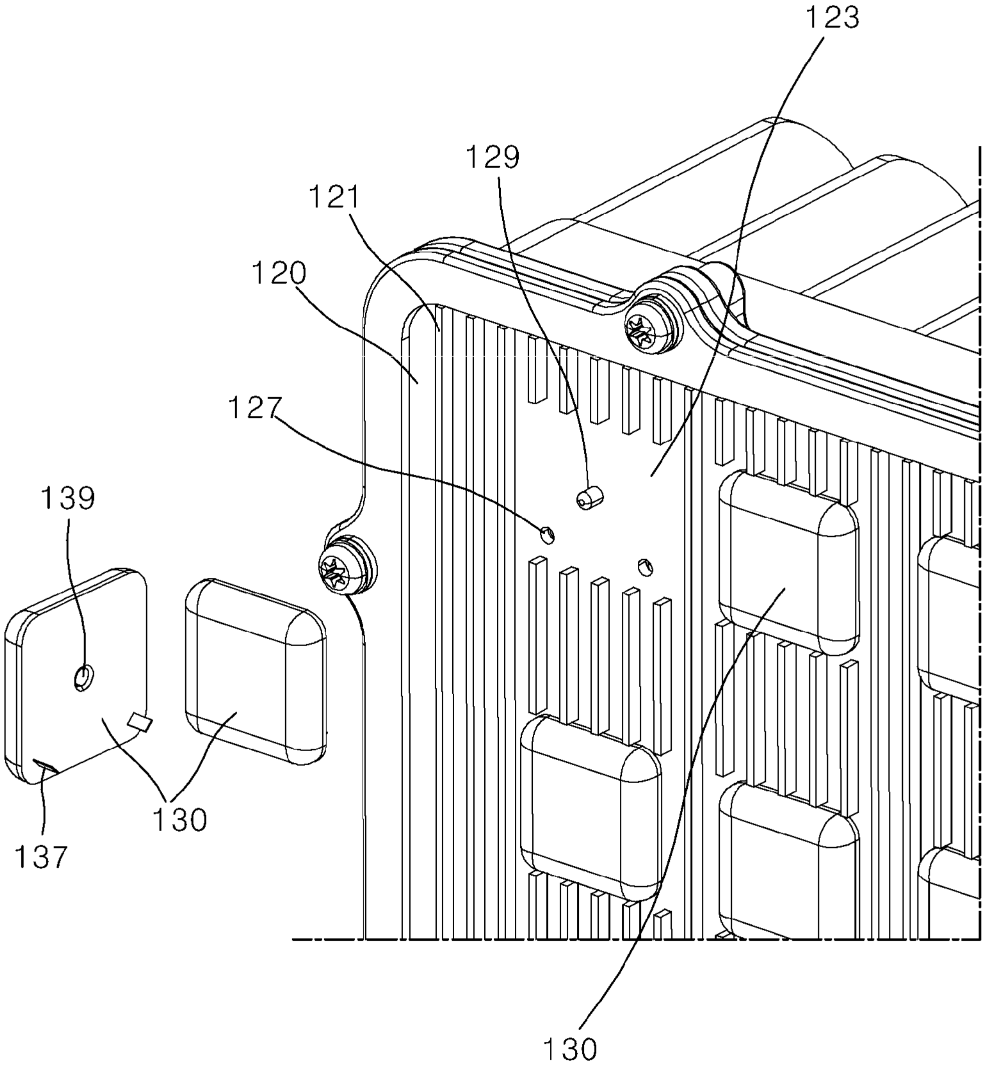
FIG. 9 is an exploded perspective view showing a coupling portion of a front surface of a heat-dissipation cover side of a radiation element in the configuration of the antenna device according to one embodiment of the present disclosure.
Figure 10:
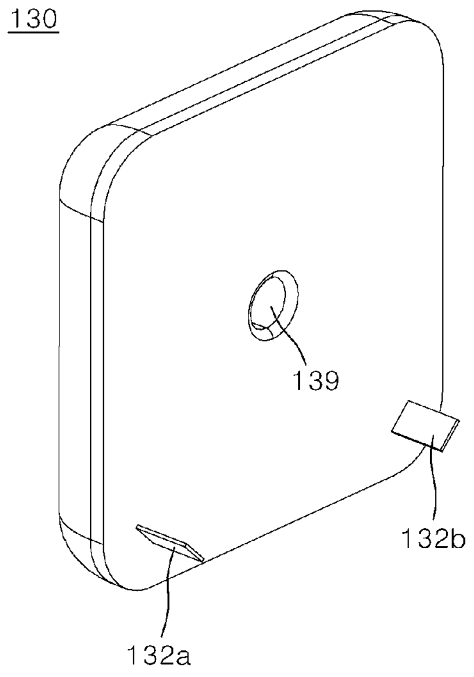
FIGS. 10 and 11 are a perspective view and an exploded perspective view showing the radiation element in the configuration of the antenna device according to one embodiment of the present disclosure.
Figure 11:
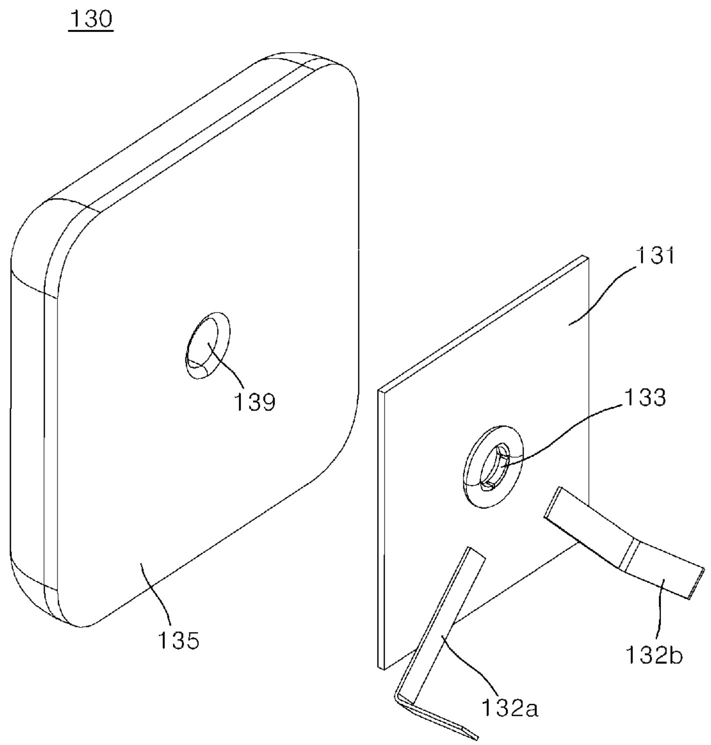

FIG. 9 is an exploded perspective view showing a coupling portion of a front surface of a heat-dissipation cover side of a radiation element in the configuration of the antenna device according to one embodiment of the present disclosure, and FIGS. 10 and 11 are a perspective view and an exploded perspective view showing the radiation element in the configuration of the antenna device according to one embodiment of the present disclosure.

In the antenna device 100 according to one embodiment of the present disclosure, as shown in FIGS. 9 to 11, the radiation element 130 may include the patch plate 131 made of the conductive material and the pair of feed terminals **132*a* and 132*b* made of the conductive material and connected to the patch plate 131**.

Since the patch plate 131 and the pair of feed terminals **132*a* and 132*b* perform the same function as the general patch type radiation element 130, a detailed operation description thereof will be omitted. However, in the antenna device 100 according to one embodiment of the present disclosure, since the radiation element 130 not only simply serves to perform the transmission and reception functions of the signal but also serves as the heat transfer medium when the system heat present in the internal space 113 of the antenna housing body 110** is discharged to the outside, the following description will be given in more detail in terms of the heat transfer.

Meanwhile, the radiation element 130, the patch plate 131, and the pair of feed terminals **132*a* and 132*b* may be insert-injection-molded by a dielectric molding material 135 having a predetermined thermal conductivity and a predetermined permittivity. The dielectric molding material 135** may include an Ultem material. The Ultem material is a material obtained by extruding and molding polyetherimide (PEI) resin, is a resin with an imide bond that provides excellent heat resistance and strength and an ether bond that shows good processability, and has consistent insulation properties in a wide range of frequencies.

Here, the dielectric molding material 135 is cured after molding to serve as a body for protecting the pair of feed terminals **132*a* and 132*b* from the outside and at the same time, is made of a dielectric material having the predetermined permittivity, and thus may not only stabilize input and output paths of the feeding signal but also have the predetermined thermal conductivity to serve as the heat transfer medium for mediating the heat-dissipated heat when the system heat of the antenna housing body 110 transmitted through the heat-dissipation cover 120 and the operation heat of the patch plate 131** itself are dissipated to the outside.

The patch plate 131 may be formed in a thin conductive plate shape having a substantial rectangle, the pair of feed terminals **132*a* and 132*b* may be connected in parallel to the rear surface of the patch plate 131 to be connected to preset feeding points, and a portion of each of the pair of feed terminals 132*a* and 132*b* may be bent and extend perpendicularly toward the front surface of the heat-dissipation cover 120**.

Here, when the dielectric molding material 135 is molded by insert-injection-molding, a portion of each of the bent front ends of the pair of feed terminals **132*a* and 132*b* may be provided to be exposed to the outside of the dielectric molding material 135, and the exposed front end of each of the pair of feed terminals 132***a* and 132*b* may pass through the heat-dissipation cover 120 through the feed terminal through hole 127 formed in the flat installation portion 123 of the heat-dissipation cover 120 and protrude toward the rear surface of the heat-dissipation cover 120.

Meanwhile, a protrusion press-fitting hole 133 press-fitted into the plurality of positioning protrusions 129 formed at the center of the flat installation portion 123 of the heat-dissipation cover 120 may be formed at the center of the patch plate 131. Likewise, protrusion insertion holes 139 into which the plurality of positioning protrusions 129 are inserted may also be formed in the dielectric molding material 135 by curing the molding material. Since the patch plate 131 is insert-injection-molded inside the dielectric molding material 135 not to be exposed to the outside, it is possible to realize the advantage that the installation of the radome for protecting the radiation element from the external environment in the related art may be omitted.

The radiation element 130 having this configuration may be coupled in a method that is press-fitted into each of the positioning protrusions 129 of the heat-dissipation cover 120. In this case, it is preferable that the rear surface of the dielectric molding material 135 is formed flat to be in close contact with the front surface of the heat-dissipation cover 120 (i.e., the front surface of the flat installation portion 123). This is to minimize the thermal conduction resistance caused by the separation from each other by the rear surface of the dielectric molding material 135, which corresponds to the rear surface of the radiation element 130 serving as the heat transfer medium, in surface thermal contact with an area portion as wide as possible of the flat installation portion 123.

In addition, the coupling method of the radiation element 130 is not limited to the method of being press-fitted into the positioning protrusion 129 and may also include a method of being fixed to the flat installation portion 123 of the heat-dissipation cover 120 via a predetermined adhesive material. In this case, the radiation element 130 may also be coupled after applying a strong bonding material that is one of the adhesive materials to the rear surface of the dielectric molding material 135 among the radiation elements 130.

In addition, the coupling method of the radiation element 130 may also include a coupling method combining the method of being press-fitted into the positioning protrusion 129 and the coupling method via the predetermined adhesive material. In other words, when the positioning protrusion 129 is fixedly inserted into the protrusion insertion hole 139 formed in the dielectric molding material 135 of the radiation element 130 and the protrusion press-fitting hole 133 of the patch plate 131, the coupling may also be possible by a more robust method after applying the predetermined adhesive material to the rear surface of the dielectric molding material 135.

When each of the radiation elements 130 is closely installed on the flat installation portion 123 of the heat-dissipation cover 120, each of the pair of feed terminals 132*a* and 132*b* may pass through the heat-dissipation cover 120 through the feed terminal through hole 127 formed in the flat installation portion 123 of the heat-dissipation cover 120 and protrude toward the rear surface of the heat-dissipation cover 120, and then may be connected to the feed connection hole 187 of the feeding panel 180.

Figure 12A:
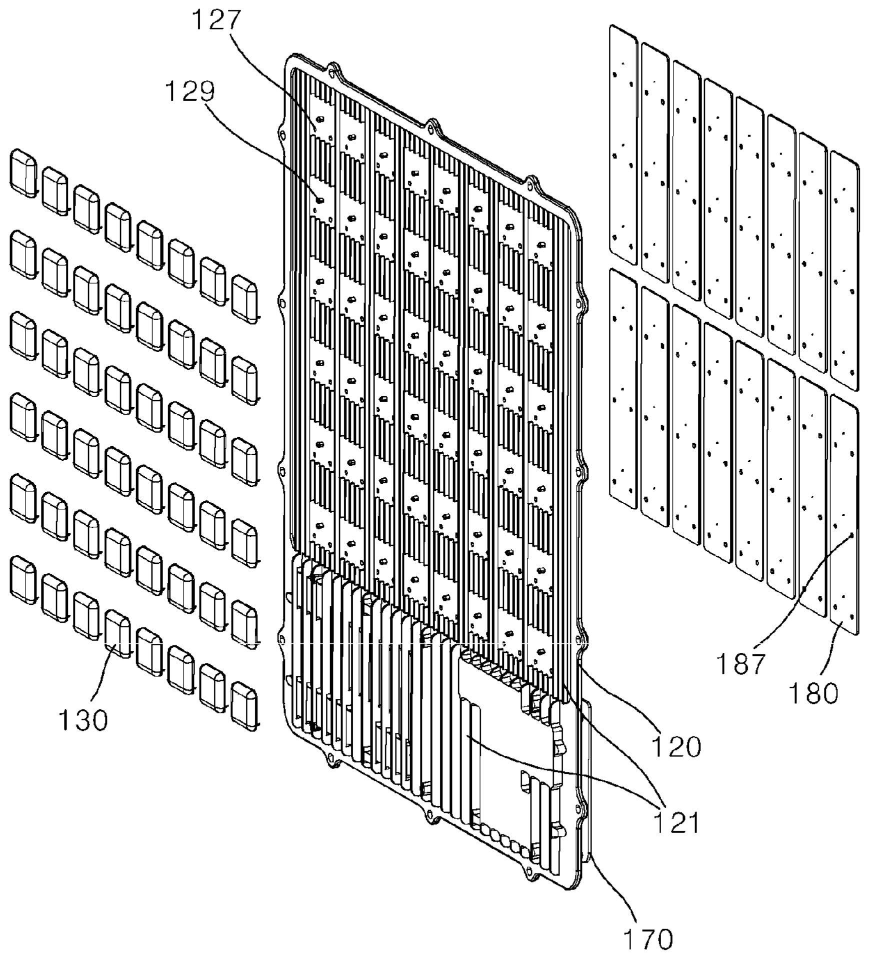
FIGS. 12A and 12B are exploded perspective views of the heat-dissipation cover side and the antenna housing body side in the configuration of the antenna device according to one embodiment of the present disclosure.
Figure 12B:
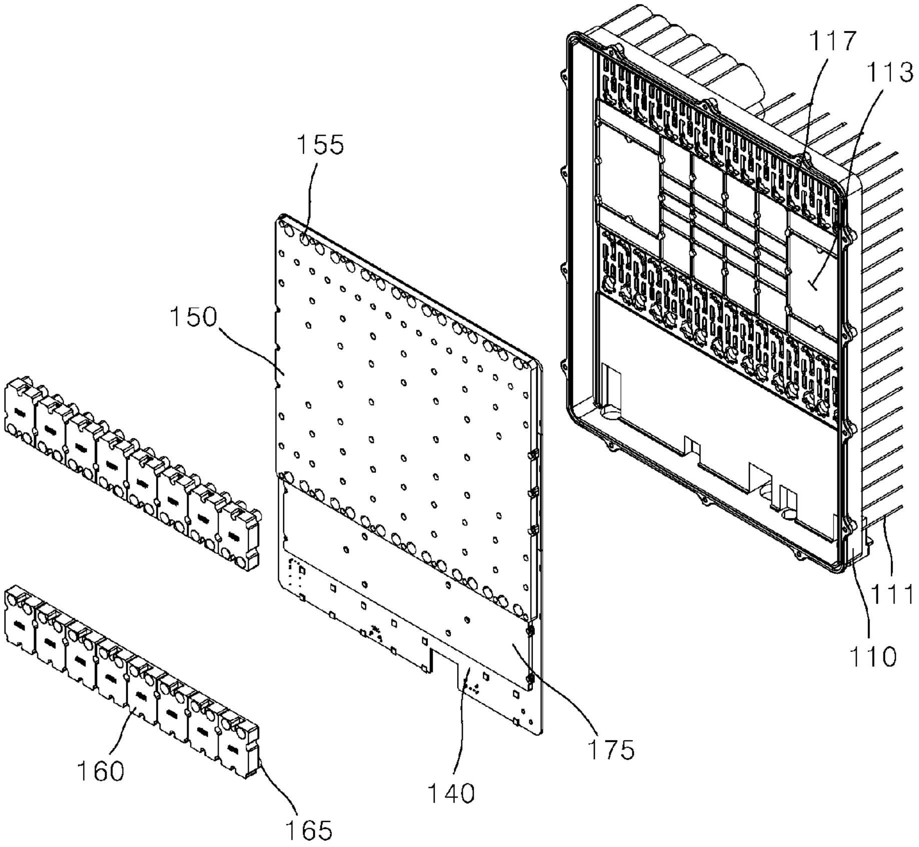
Figure 13A:
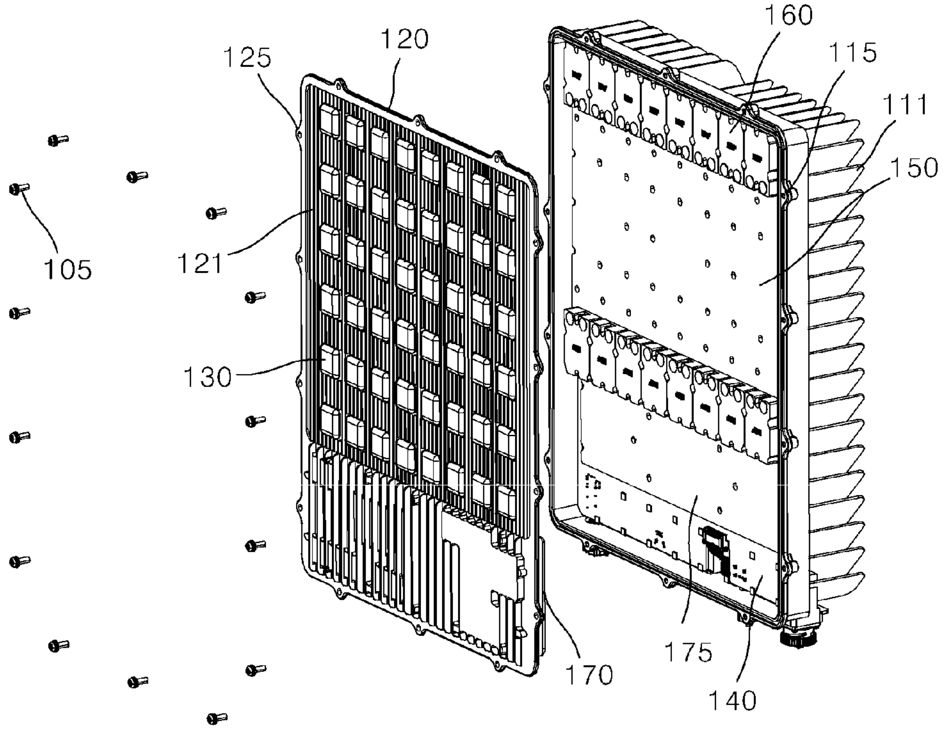
FIGS. 13A and 13B are exploded perspective views showing an assembly sequence of the antenna device according to one embodiment of the present disclosure.
Figure 13B:
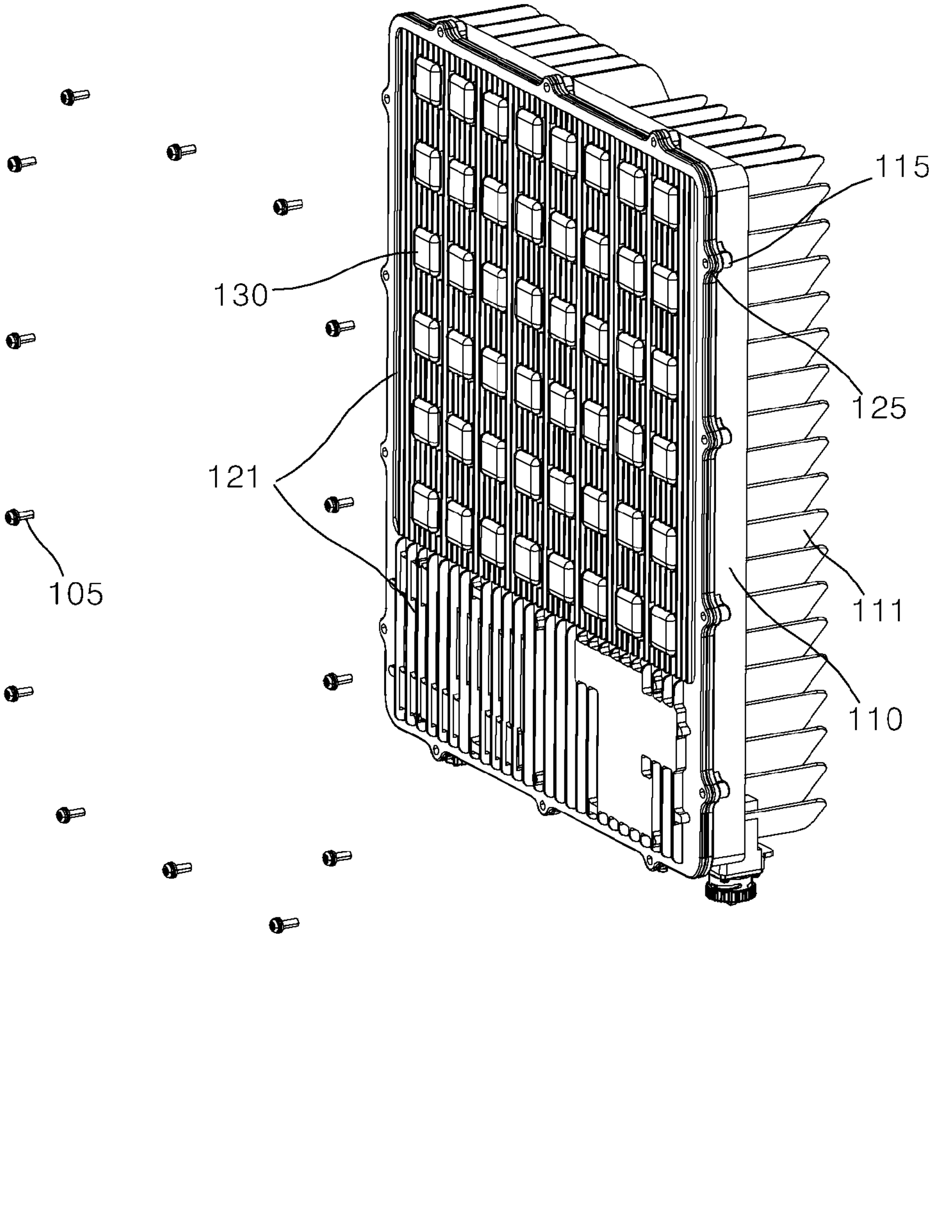

FIGS. 12A and 12B are exploded perspective views of the heat-dissipation cover side and the antenna housing body side in the configuration of the antenna device according to one embodiment of the present disclosure, and FIGS. 13A and 13B are exploded perspective views showing an assembly sequence of the antenna device according to one embodiment of the present disclosure.

An assembly process of the antenna device 100 according to one embodiment of the present disclosure configured as described above will be described in detail with reference to the accompanying drawings.

First, as shown in FIG. 12A, on the front surface of the heat-dissipation cover 120, each of the plurality of radiation elements 130 is closely coupled to the flat installation portion 123 formed on the front surface of the heat-dissipation cover 120. In this case, as described above, the pair of feed terminals 132*a* and 132*b* of each of the radiation elements 130 may protrude to the rear surface of the heat-dissipation cover 120 through the feed terminal through hole 127 and may be feeding-connected in the method of being respectively connected to the feed connection holes 187 of the feeding panel 180 closely disposed on the rear surface of the heat-dissipation cover 120.

In addition, as shown in FIG. 12A, the PSU board 170 is closely coupled to a lower end of the rear surface of the heat-dissipation cover 120, and the front surfaces of the plurality of PSU elements mounted and disposed on the front surface of the PSU board 170 are closely coupled to be accommodated in the heat-dissipation cover heat accommodating portion 122 formed on the rear surface of the heat-dissipation cover 120.

As described above, when the plurality of radiation elements 130 are closely coupled to the front surface of the heat-dissipation cover 120 and the plurality of feeding panels 180 and the PSU board 170 are closely coupled to the rear surface of the heat-dissipation cover 120, the assembly of the heat-dissipation cover 120 side is completed.

Next, as shown in FIG. 12B, the respective feeding-related control components mounted on the rear surface of the main board 140 and the protruding portions of the predetermined patterns are laminated and coupled in the internal space 113 of the antenna housing body 110 so as to be closely accommodated in the heat accommodating patterns 117 formed on the inner surface of the antenna housing body 110.

In addition, the plurality of RF filters 160 are laminated and coupled so that after the clamshell board 150 is laminated on and coupled to the front surface of the main board 140, the input/output terminal unit 165 of the RF filter 160 is inserted into the feeding connection hole 155 formed in the clamshell board 150 and is electrically conducted with the feeding control-related components mounted on the rear surface of the main board 140. In this case, the shielding plate 175 for separating the PSU board 170 from the front surface of the main board 140 and coupling the PSU board 170 to the heat-dissipation cover 120 side may be laminated on and coupled to a portion of the front surface of the main board 140.

As described above, when the plurality of RF filters 160 are fixed after the main board 140, the clamshell board 150, and the shielding plate 175 are each disposed to be sequentially laminated in the internal space 113 of the antenna housing body 110, the assembly of the antenna housing body 110 side is completed.

Then, when the heat-dissipation cover 120 in a state in which the plurality of radiation elements 130 are coupled is moved to the front end side of the antenna housing body 110 without a separate radome, as shown in FIG. 13A, and the heat-dissipation cover 120 is firmly coupled to the front end of the antenna housing body 110 by an operation of passing the plurality of fastening screws 105 through the screw through holes of the screw through ends 125 formed on the edge end of the heat-dissipation cover 120 and then fastening the plurality of fastening screws 105 to the screw fastening holes of the screw fastening ends 115 formed on the edge end of the antenna housing body 110, as shown in FIG. 13B, the entire assembly of the antenna device is completed.

A description of a heat-dissipation process of the antenna device 100 according to one embodiment of the present disclosure configured as described above will be briefly given as follows.

The heat generated from the feeding control-related components (i.e., the heating elements) mounted on the rear surface of the main board 140 among the system heat generated from the internal space 113 of the antenna housing body 110 may be directly transmitted toward the rear surface of the antenna housing body 110 through the surface thermal contact with the heat accommodating patterns 117 formed on the inner surface of the antenna housing body 110 and then dissipated rearward through the plurality of heat-dissipation fins 111 formed integrally on the rear surface of the antenna housing body 110.

In addition, the heat present between the front surface of the main board 140 and the heat-dissipation cover 120 among the system heat generated from the internal space 113 of the antenna housing body 110 may be transmitted forward through at least any one of the heat-dissipation covers 120 made of the metal material and discharged forward through the first fine uneven portion 121*a* of the fine heat-dissipation uneven portion 121 directly exposed to the outside air or using the dielectric molding material 135 of the radiation element 130 as the heat transfer medium.

In addition, the heat generated from the PSU elements of the PSU board 170 among the system heat generated from the internal space 113 of the antenna housing body 110 may be directly transmitted toward the front surface of the heat-dissipation cover 120 through the surface thermal contact with the heat-dissipation cover heat accommodating portion 122 formed on the rear surface of the heat-dissipation cover 120 and then discharged forward through the second fine uneven portion 121*b* of the fine heat-dissipation uneven portion 121 directly exposed to the outside air.

As described above, the antenna device 100 according to one embodiment of the present disclosure has the advantage in that the heat generated between the main board 140 and the heat-dissipation cover 120 may be branched and discharged to the front side on which the heat-dissipation cover 120 is disposed and the rear side on which the plurality of heat-dissipation fins 111 are disposed, thereby improving the heat-dissipation structure in which the heat is concentrically dissipated only to the rear side in the related art.

More specifically, at least some of the heat generated by the radiation elements 130 and the heating elements (e.g., the PSU elements of the PSU board 170) disposed behind the heat-dissipation cover 120 may be discharged forward from the antenna housing body 110 through at least any one of the radiation element 130 exposed to the outside air and the front surface of the heat-dissipation cover 120 and at least some of the heat generated from the heating elements (e.g., the feeding control-related components) disposed inside the antenna housing body 110 may also be discharged rearward from the antenna housing body 110 via the plurality of heat-dissipation fins 111 formed on the rear surface of the antenna housing body 110.

As described above, since the antenna device 100 according to one embodiment of the present disclosure can delete the radome that has been an essential component for protecting the radiation elements 130 from the external environment in the related art and also serve as the reflector of the electromagnetic waves irradiated from the radiation elements 130 instead of the heat-dissipation cover 120, it is possible to reduce the manufacturing cost of the product due to the reduction in the number of components and reduce the volume of each component in the front-rear direction, thereby realizing the slimness design of the product.

The antenna device according to one embodiment of the present disclosure has been described above in detail with reference to the accompanying drawings. However, it goes without saying that the embodiments of the present disclosure are not necessarily limited by the above-described embodiments, and various modifications and implementation within the equivalent scope are possible by those skilled in the art to which the present disclosure pertains. Therefore, the true scope of the present disclosure will be determined by the appended claims.

INDUSTRIAL APPLICABILITY

The present disclosure provides the antenna device, which may delete components, such as the radome and the board (PCB) on which the radiation elements are mounted, thereby reducing the manufacturing cost of the product and dissipating heat in the balanced manner in all directions of the antenna housing body.

The invention claimed is:

1. An antenna device comprising:

a heat-dissipation cover;

a plurality of radiation elements disposed on a front surface of the heat-dissipation cover and directly exposed to outside air without being covered, and configured to implement beamforming; and an antenna housing body on which the heat-dissipation cover is installed, wherein heat generated from the radiation elements and heating elements disposed behind the heat-dissipation cover is discharged forward from the antenna housing body through at least any one of the radiation element exposed to the outside air and the front surface of the heat-dissipation cover, wherein front surfaces of a plurality of radio frequency (RF) filters and front surfaces of a plurality of PSU elements are disposed in direct contact with a rear surface of the heat-dissipation cover.

2. The antenna device of claim 1, wherein the plurality of radiation elements are adopted as any one of a dipole type dipole antenna and a patch type patch antenna.

3. The antenna device of claim 1, wherein the plurality of radiation elements includes some radiation elements each comprising a patch plate made of a conductive material and a pair of feed terminals made of the conductive material connected to the patch plate.

4. The antenna device of claim 3, wherein the dielectric molding material is adopted as a predetermined thermal conductive material so that the heat generated between the antenna housing body and the heat-dissipation cover is transmitted forward from the antenna housing body in a thermal conduction method.

5. The antenna device of claim 4, wherein the predetermined thermal conductive material includes an Ultem material.

6. The antenna device of claim 3, wherein the plurality of radiation elements are bonded on the front surface of the heat-dissipation cover via a predetermined adhesive material.

7. The antenna device of claim 3, wherein a plurality of positioning protrusions are formed to protrude forward from the front surface of the heat-dissipation cover, and the plurality of radiation elements are press-fitted into and coupled to the plurality of positioning protrusions, respectively.

8. The antenna device of claim 3, wherein the plurality of radiation elements are bonded to the front surface of the heat-dissipation cover via a predetermined adhesive material and press-fitted into and coupled to a plurality of positioning protrusions formed to protrude forward from the front surface of the heat-dissipation cover.

9. The antenna device of claim 3, wherein a feed terminal through hole passing through the heat-dissipation cover in a front-rear direction is formed, and the plurality of radiation elements are connected to an antenna sub-board disposed in direct contact with the rear surface of the heat-dissipation cover after each of the pair of feed terminals passes through the feed terminal through hole.

10. The antenna device of claim 3, wherein a rear surface of the dielectric molding material is fixed to and in direct contact with the front surface of the heat-dissipation cover to minimize thermal conduction resistance.

11. The antenna device of claim 3, wherein the patch plate and the pair of feed terminals are insert-injection-molded by a dielectric molding material having a predetermined thermal conductivity and a predetermined permittivity.

12. The antenna device of claim 1, wherein a fine heat-dissipation uneven portion which increases a heat-dissipation surface area of the remaining portion except for a portion of the front surface of the heat-dissipation cover in contact with the plurality of radiation elements is integrally formed on the heat-dissipation cover.

13. The antenna device of claim 12, wherein the fine heat-dissipation uneven portion is provided in the form of a plurality of ribs protruding a predetermined length from the front surface of the heat-dissipation cover and formed lengthily in a vertical direction.

14. The antenna device of claim 13, wherein a plurality of flat installation portions to which each of a plurality of heat-dissipation elements is surface-fixed is formed on the front surface of the heat-dissipation cover, and the fine heat-dissipation uneven portion includes:

a first fine uneven portion formed between the plurality of flat installation portions; and a second fine uneven portion formed outside the plurality of flat installation portions.

15. The antenna device of claim 14, wherein a power supply unit (PSU) having a plurality of PSU elements mounted on a front surface thereof is correspondingly disposed on the rear surface of the heat-dissipation cover on which the second fine uneven portion is formed.

16. The antenna device of claim 1, wherein the plurality of RF filters are adopted as any one of a cavity filter and a ceramic waveguide filter.

17. The antenna device of claim 1, wherein a heat-dissipation cover heat accommodating portion is further formed to be recessed forward from the rear surface of the heat-dissipation cover so that the front surfaces of the plurality of PSU elements are accommodated in direct contact therewith, and the front surfaces of the plurality of PSU elements are accommodated to be in surface thermal contact with the heat-dissipation cover heat accommodating portion.

18. The antenna device of claim 1, wherein the heat-dissipation cover is mold-manufactured in a die-casting method with a metal molding material of any one of an aluminum (Al) material or a magnesium (Mg) material.

19. An antenna device comprising:

a heat-dissipation cover;

a plurality of radiation elements disposed on a front surface of the heat-dissipation cover, exposed to outside air, and configured to implement beamforming;

an antenna housing body on which the heat-dissipation cover is installed and having a plurality of heat-dissipation fins integrally formed on a rear surface thereof; and a main board disposed to be laminated in an internal space between the antenna housing body and the heat-dissipation cover, wherein heat generated between the main board and the heat-dissipation cover is branched and discharged to a front side on which the heat-dissipation cover is disposed and a rear side on which the plurality of heat-dissipation fins are disposed, and wherein front surfaces of a plurality of radio frequency (RF) filters and front surfaces of a plurality of PSU elements are disposed in direct contact with the rear surface of the heat-dissipation cover.

20. An antenna device comprising:

a heat-dissipation cover;

a plurality of radiation elements disposed on a front surface of the heat-dissipation cover, exposed to outside air, and configured to implement beamforming; and an antenna housing body on which the heat-dissipation cover is installed and having a plurality of heat-dissipation fins integrally formed on a rear surface thereof, wherein at least some of heat generated from the radiation elements and heating elements disposed behind the heat-dissipation cover is discharged forward from the antenna housing body through at least any one of the radiation element exposed to the outside air and the front surface of the heat-dissipation cover, and at least some of the heating elements disposed inside the antenna housing body are discharged rearward from the antenna housing body via the plurality of heat-dissipation fins formed on the rear surface of the antenna housing body, wherein the plurality of radiation elements includes some radiation elements each comprising a patch plate made of a conductive material and a pair of feed terminals made of the conductive material connected to the patch plate.

* * * * *